June 6, 1944.     L. B. HOFFMANN     2,350,355
SHUTTER MECHANISM
Filed May 19, 1941     8 Sheets-Sheet 1

Inventor
Louis B. Hoffmann.

Attorneys.

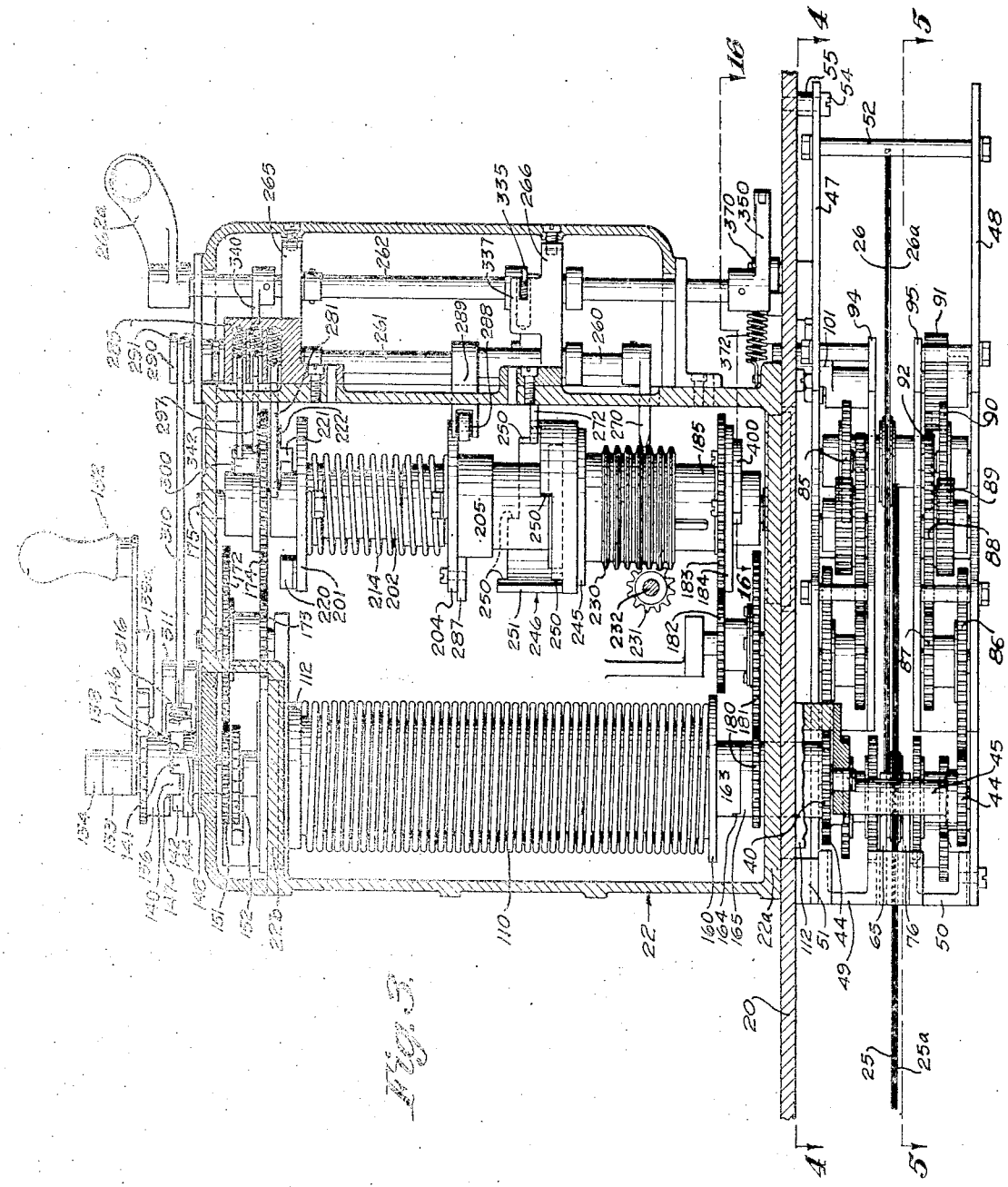

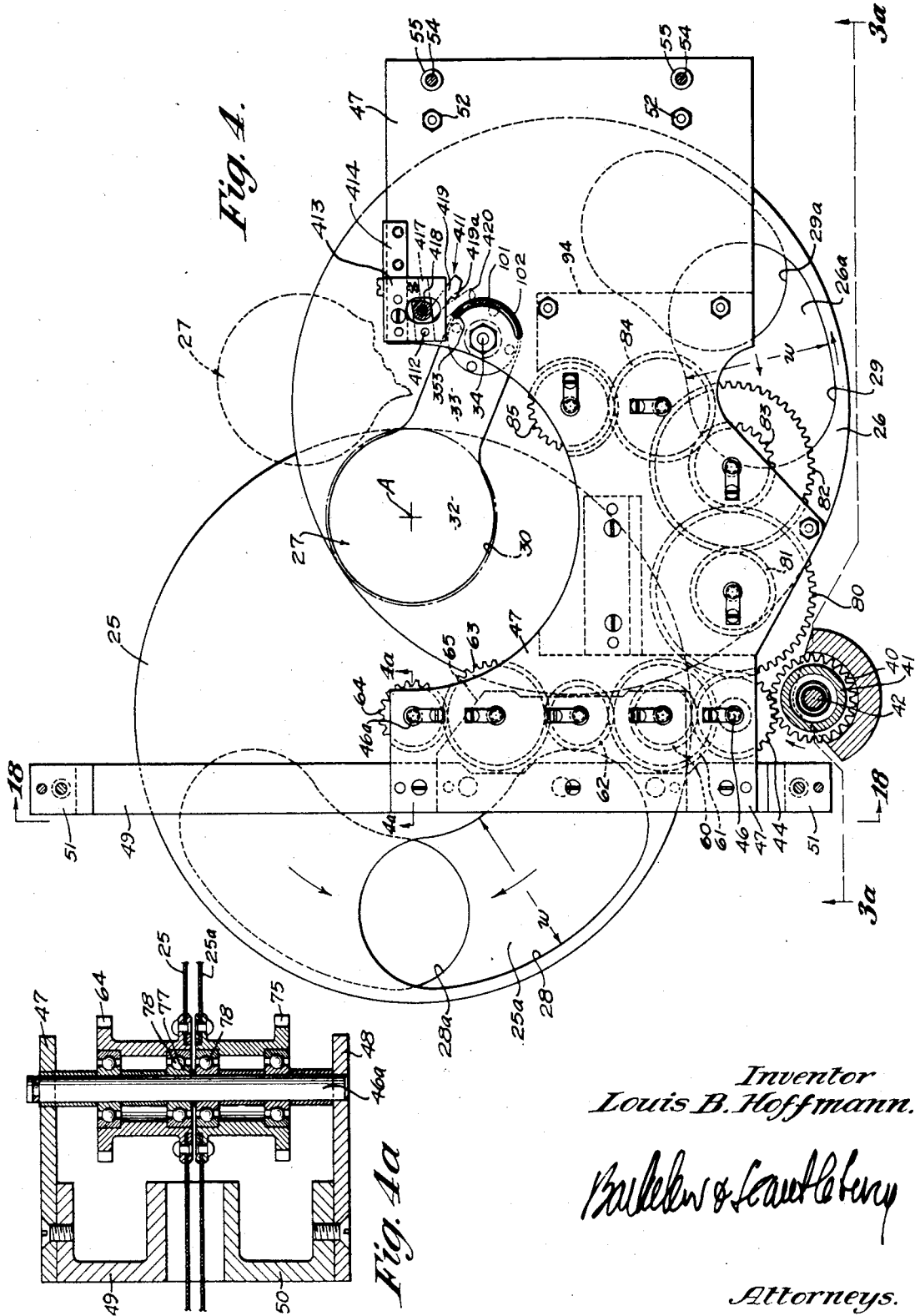

June 6, 1944.   L. B. HOFFMANN   2,350,355
SHUTTER MECHANISM
Filed May 19, 1941   8 Sheets-Sheet 4
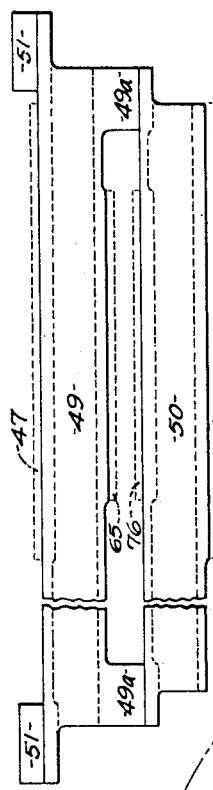
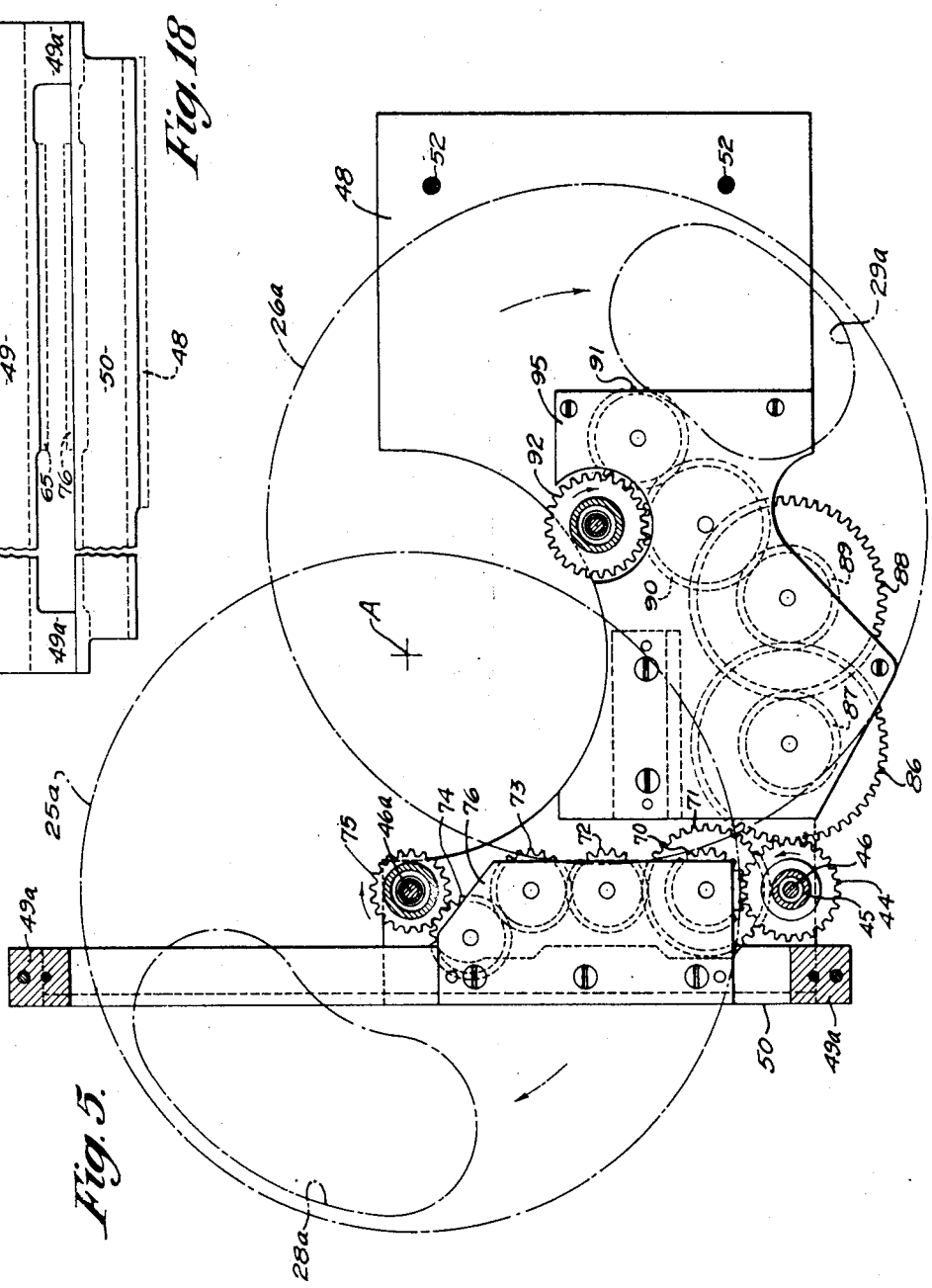
Inventor
Louis B. Hoffmann.
Attorneys.

June 6, 1944.  L. B. HOFFMANN  2,350,355
SHUTTER MECHANISM
Filed May 19, 1941  8 Sheets-Sheet 5
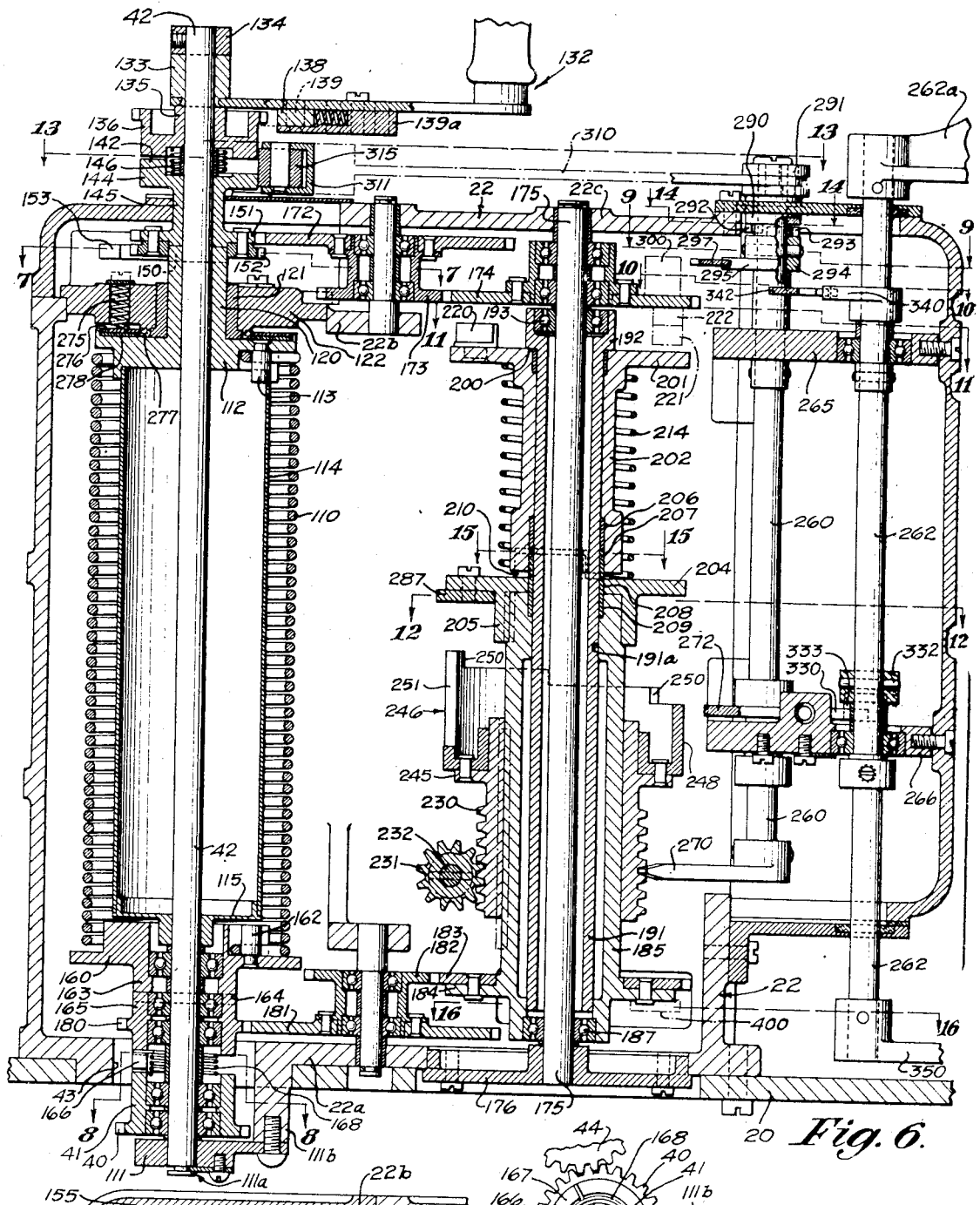
Fig. 6.
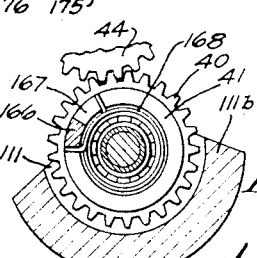
Fig. 8.
Fig. 7.
Inventor
Louis B. Hoffmann
Attorneys.

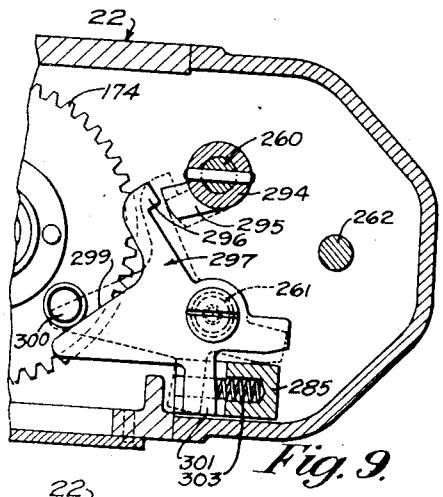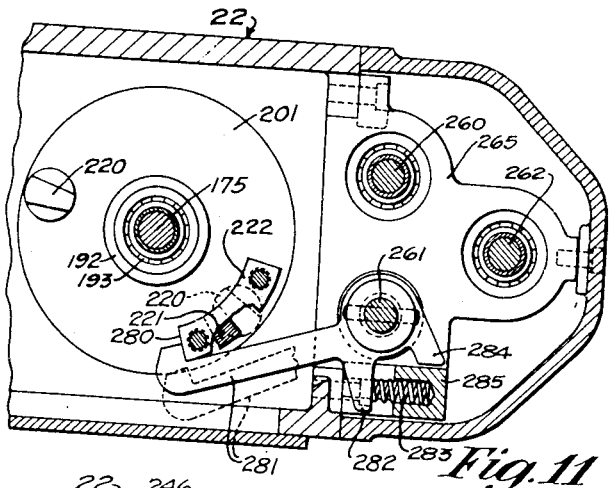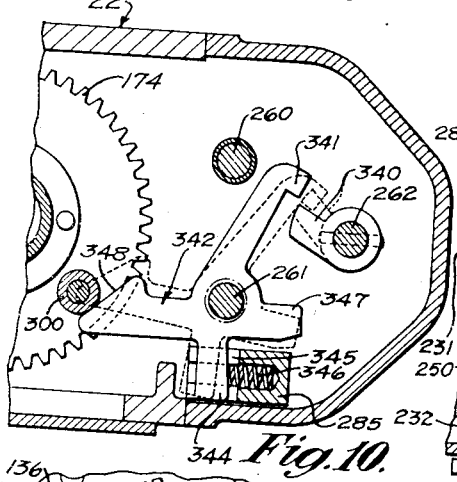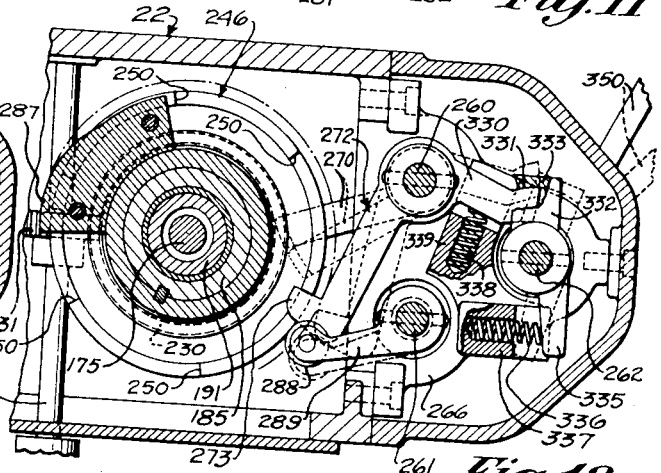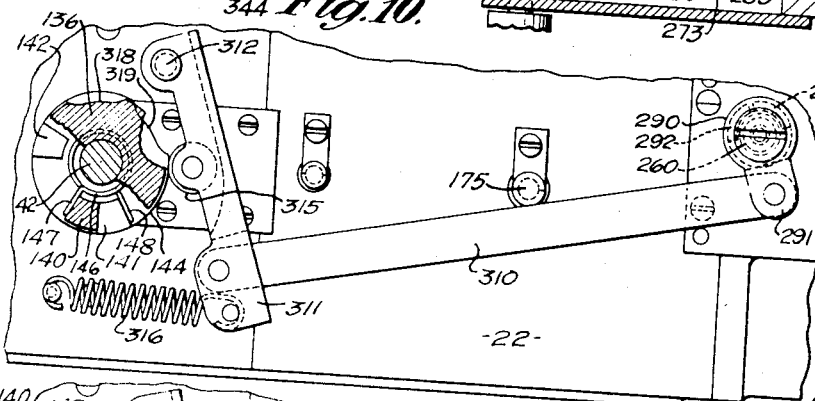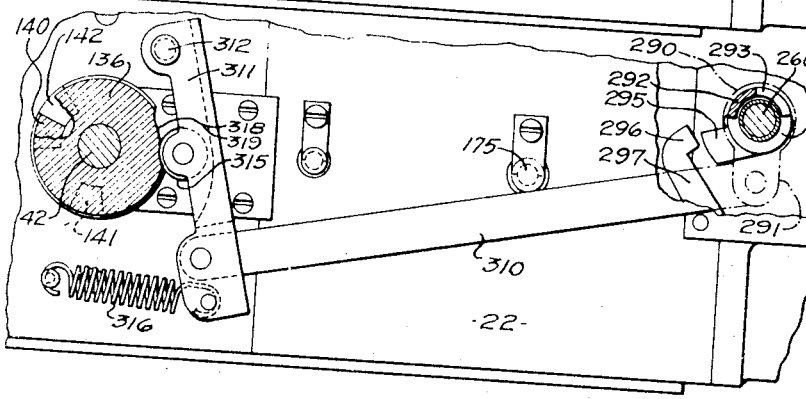
Inventor
Louis B. Hoffmann.
Attorneys.

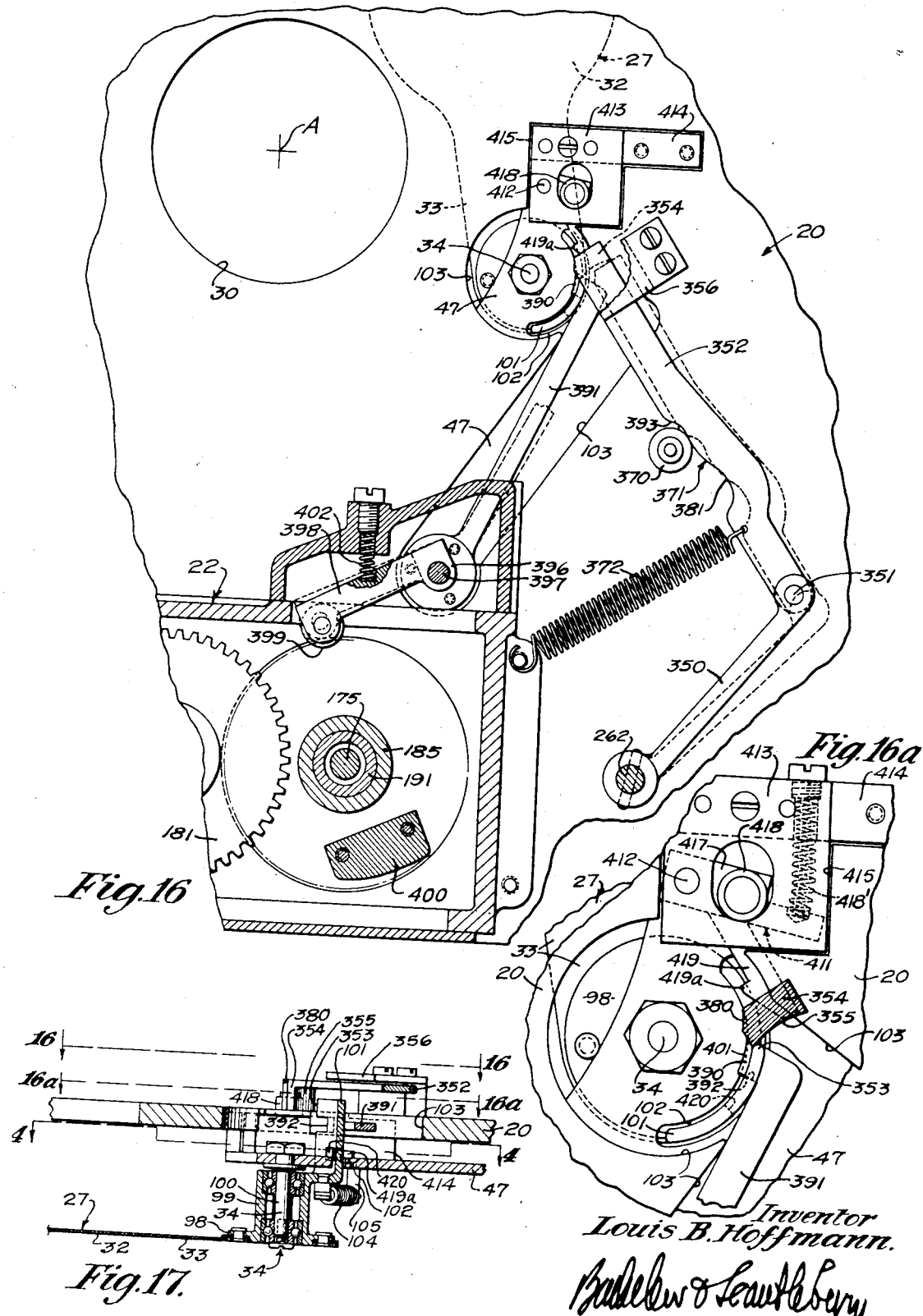

Patented June 6, 1944

2,350,355

UNITED STATES PATENT OFFICE 2,350,355

SHUTTER MECHANISM

Louis B. Hoffmann, Los Angeles, Calif., assignor to Mitchell Camera Corporation, West Hollywood, Calif., a corporation of Delaware Application May 19, 1941, Serial No. 394,122

46 Claims. (Cl. 95—61)

This invention relates generally to camera shutters, particularly and illustratively to rotary type shutters for cameras designed to take successive still photographs from aircraft, though not necessarily limited to cameras of that class.

Shutters of the type in question must be designed both for large aperture and short exposure time, and for high exposure efficiency. For example, very large iris opening may be desired, while the exposure times may range from $\frac{1}{50}$ sec. to $\frac{1}{350}$ sec. or less. It is therefore evident that the shutters must be of relatively large size, and must be accelerated in short times to relatively high velocities and subsequently decelerated to rest. This combination of design requirements presents certain evident problems. For example, it has been common practice to drive shutters by means of a spring, which may be made to accelerate the shutters to the necessary extent provided sufficient acceleration time and travel are available. However, the problem of stopping the shutters has remained unsolved in a fully satisfactory manner, efforts to arrest the motion of the shutters before they can give a second exposure being made extremely difficult by the very high momentum which they acquired. Also the mere mechanical problem of providing shutter structure and power transmission light enough to be readily accelerated and strong enough to take the accelerating forces without distortion, has been found to be a problem of some magnitude in shutters of large aperture. This applies to both positive and negative acceleration.

A general object of my invention is to provide a shutter and driving mechanism which may be used for large apertures as well as small, which will attain high speeds and high exposure efficiency, and in which the necessary accelerating and decelerating forces are small and the mechanism is subjected to correspondingly small forces and stresses.

Other and more detailed objects will appear from the following descriptions of the corresponding accomplishments and the preferred mechanisms, their functions and design. A preliminary description of the characteristic features of the present preferred form of the invention will enable it to be understood more readily.

The driving mechanism of the invention includes, as one of its major characteristics, a closed system or train which, when in what may be termed its normal condition, is movable as a whole without relative displacement between its parts. This closed train includes, as one of its elements, an energy storing unit, e. g. a spring. The movable shutter unit is drivingly connected to one end, the energy output end, of the distortable storing unit.

In the normally closed train, directly connected to the driving end of the energy storing unit and to the shutter unit, there is an element which may be acted upon to arrest movement. This element, formed and acting to be capable of arresting the movement preferably at various selected positions, is here termed the selector.

Between the selector and the energy receiving end of the distortable storing unit there is a lost motion mechanism in the closed train, consisting typically of two engageable abutments which are separable in such direction that the abutment connected to the energy receiving end of the storage unit may move away from the abutment connected to the selector and the energy output end in the direction of movement of the system as a whole.

In such a system, when movement energy is applied at any point to the closed train either from an external source or from an acquired momentum of the train or shutter unit, and when the selector is not stopped, the complete mechanism will move freely as a whole—it will "free wheel" or "coast." If the selector be stopped and energy then applied to any point in that part of the train connected directly with the energy receiving end of the storage unit (e. g. the winding end of a spring) then that end of the storage unit will move ahead while the selector and shutter unit stand still. The amount by which the storage unit will be stressed in receiving energy, depends then on how far its receiving end is moved after its delivery end is stopped; and that may be determined and adjusted either by providing an adjustably variable point at which the delivery end is stopped, or an adjustably variable point at which the stressing of the storage unit is stopped. The former is preferred, and thus the selector is placed in that position in the train which has been stated, and the stressing of the storage unit is terminated by a fixed position stop.

After the storage unit has been stressed and its energy receiving end prevented from backing up by suitable means, then if the energy delivery end be released (as by releasing the selector) the stored energy will drive the previously held part of the train and the shutter unit forward until they reach a position corresponding to that to which the other part of the train was previously advanced. The speed to which the shutter unit is accelerated depends on the amount of energy which has been selectively stored in the storage unit. At the end of shutter driving movement the stop which limited the supply of energy to the storage element is removed, the two separable abutments re-engage, and the whole system is then again in condition for free wheeling or coasting until its momentum is dissipated or absorbed and it comes to a stop. The whole mechanism can thus be decelerated from very high velocities with minimum accompanying stresses.

The necessary stresses involved in initial acceleration while the energy storage is driving the shutter unit depend among other things on the acceleration time period. The preferred type of shutter unit is one which allows a relatively long shutter movement before the shutter reaches its exposure position. Consequently, as will be seen, the necessary accelerating forces and accompanying stresses on the mechanism are kept low.

In the present specific preferred form, the shutter unit comprises a high speed rotary shutter, a low speed rotary shutter, and an oscillatory auxiliary shutter. The high speed shutter, rotating at say eight times the speed of the low speed shutter, produces eight shutter openings at the exposure axis for one shutter opening provided by the low speed shutter. Each eighth high speed shutter opening at the exposure axis coincides with a low speed shutter opening at said axis, so that an exposure may result. The advantage in using this combination of low and high speed shutters is that the high speed shutter may accelerate through a number of revolutions without producing an exposure, and when finally up to speed, the low speed shutter then opens and an exposure results, the duration of which is governed, among other things, by the speed attained by the high speed shutter. Incidently, this speed may reach six or seven thousand revolutions or more per minute, depending upon the drive spring used. The auxiliary shutter normally stands across the exposure axis, and is preferably drawn aside just before the high and low speed shutters are started to rotate. It is then caused to move back in line with the exposure axis after the coincidence of the high and low speed shutter openings at said axis, and before the occurrence of the next low speed shutter opening at the axis. Thus the high and low speed shutters may be permitted to coast to a stop, since even though there will be a coincidence of high speed and low speed shutter openings at the exposure axis each eighth revolution of the high speed shutter, the auxiliary shutter moves into occulting position after the first coincidence, and subsequent coincidences therefore do not produce further exposures. It will be evident that if the shutters are braked to a stop before the low speed shutter makes a complete revolution following exposure, the auxiliary shutter may be dispensed with, and in simple forms of my invention, for some purposes, the auxiliary shutter may thus be eliminated.

In addition to what has been outlined, the invention further provides various automatic actuations and controls which will be best understood both in their broad functional characteristics and in their specifically preferred designs from the following detailed descriptions. And various objects and accomplishments not named above will be gathered from the following detailed description of one present illustrative embodiment, reference being had to the accompanying drawings, in which:

Fig. 3 is a vertical section, the upper portion being taken on line 3—3 of Fig. 1 and the lower portion being taken on line 3a—3a of Fig. 4;

Fig. 4 is a horizontal section taken on line 4—4 of Fig. 3 and Fig. 17;

Fig. 4a is an enlarged detail section on line 4a—4a of Fig. 4;

Fig. 5 is a horizontal section taken on line 5—5 of Fig. 3;

Fig. 6 is a vertical section taken on line 6—6 of Fig. 1;

Fig. 7 is a section taken on broken line 7—7 of Fig. 6;

Fig. 8 is a section taken on broken line 8—8 of Fig. 6;

Fig. 9 is a section taken on broken line 9—9 of Fig. 6, but omitting for clarity certain parts below which are shown in Fig. 10;

Fig. 10 is a section taken on line 10—10 of Fig. 6, but omitting for clarity certain parts below which are shown in Fig. 11;

Fig. 11 is a section taken on line 11—11 of Fig. 6;

Fig. 12 is a section taken on line 12—12 of Fig. 6;

Fig. 13 is a section taken on line 13—13 of Fig. 6;

Fig. 14 is a view similar to Fig. 13, but showing another position and with parts broken away to the section line 14—14 on Fig. 6;

Fig. 15 is a section taken on line 15—15 of Fig. 6;

Fig. 16 is a section, with parts broken away, taken on line 16—16 of Figs. 3, 6 and 17;

Fig. 16a is an enlarged detail section on line 16a—16a of Fig. 17;

Fig. 17 is a section taken on line 17—17 of Fig. 1;

Fig. 18 is a detail view of a bracket structure, looking in the direction of the arrows 18—18 in Fig. 4.

Figure 1:
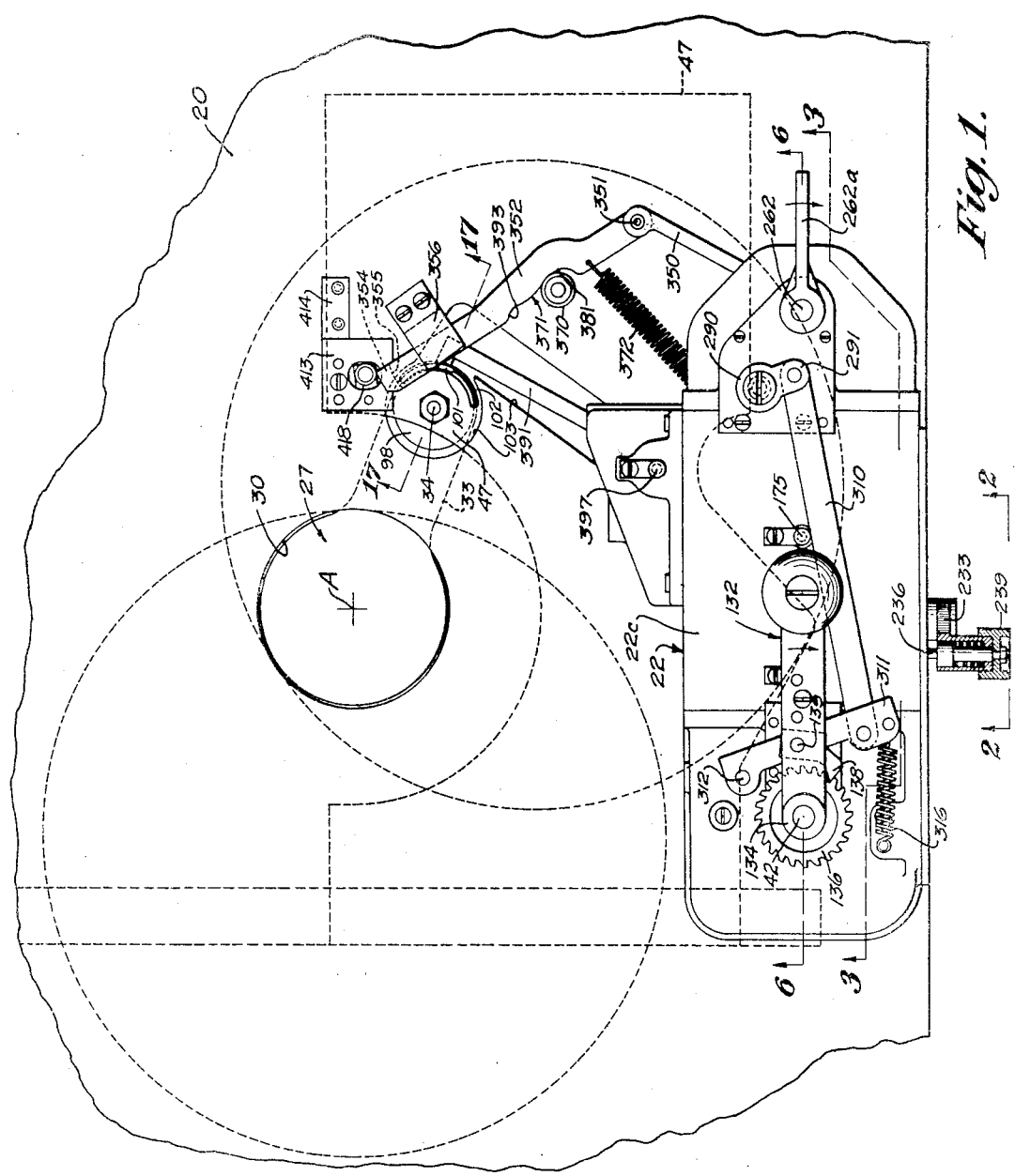
Fig. 1 is a top plan view, partially broken away, of a shutter mechanism in accordance with the invention.

All the figures show the mechanism in the position it reaches at the end of the operation of winding the driving spring, ready for tripping; except Figs. 16 and 16a which show positions of the auxiliary shutter mechanism as the mechanism is being tripped, and Fig. 14 which shows positions of certain parts for moving the selector and release latch into operative position.

The general sequence of the following detailed description will be as follows:

I. The shutter mechanism proper, or shutter unit and the auxiliary shutter.
II. The shutter driving mechanism.
III. The selector mechanism.
IV. Control and actuation of the selector mechanism, and free wheeling.
V. Auxiliary shutter actuation.

These divisions of description are not rigid, as certain parts have functions in more than one division, and as preliminary descriptive references to parts later described are found necessary to an easily understandable exposition of the mechanism.

I. *The rotating shutter unit*

In the drawings, numeral 20 designates a horizontal frame plate, below which are the rotating shutter unit and shutter driving gearing, and above which is secured a housing 22 for the shutter driving and control mechanism. Plate 20 merely typifies any suitable mounting member or frame. It is not contemplated that the actual shutter mechanism will contain such a plate, but it is shown here to indicate some means of supporting the mechanisms and to indicate the position of an exposure aperture or axis.

The rotating shutter unit preferably comprises a high speed shutter, made up of a pair of concentric, oppositely rotating high speed shutter disks 25 and 25a, and a low speed shutter, made up of a pair of concentric, oppositely rotating low speed shutter disks 26 and 26a. The complete shutter mechanism also includes an auxiliary pivoted shutter blade or occulter 27 whose operation will be later described. The two oppositely rotating high speed shutter disks have coacting exposure apertures 28 and 28a, and the two oppositely rotating low speed shutter disks have coacting exposure apertures 29 and 29a. The apertures in the high speed disks, as well as those in the low speed disks, are so relatively positioned as to register with one another once each revolution at the location of the exposure axis A. Frame plate 20 is shown as formed with an exposure aperture 30 of suitable diameter concentric with axis A.

Figure 19:
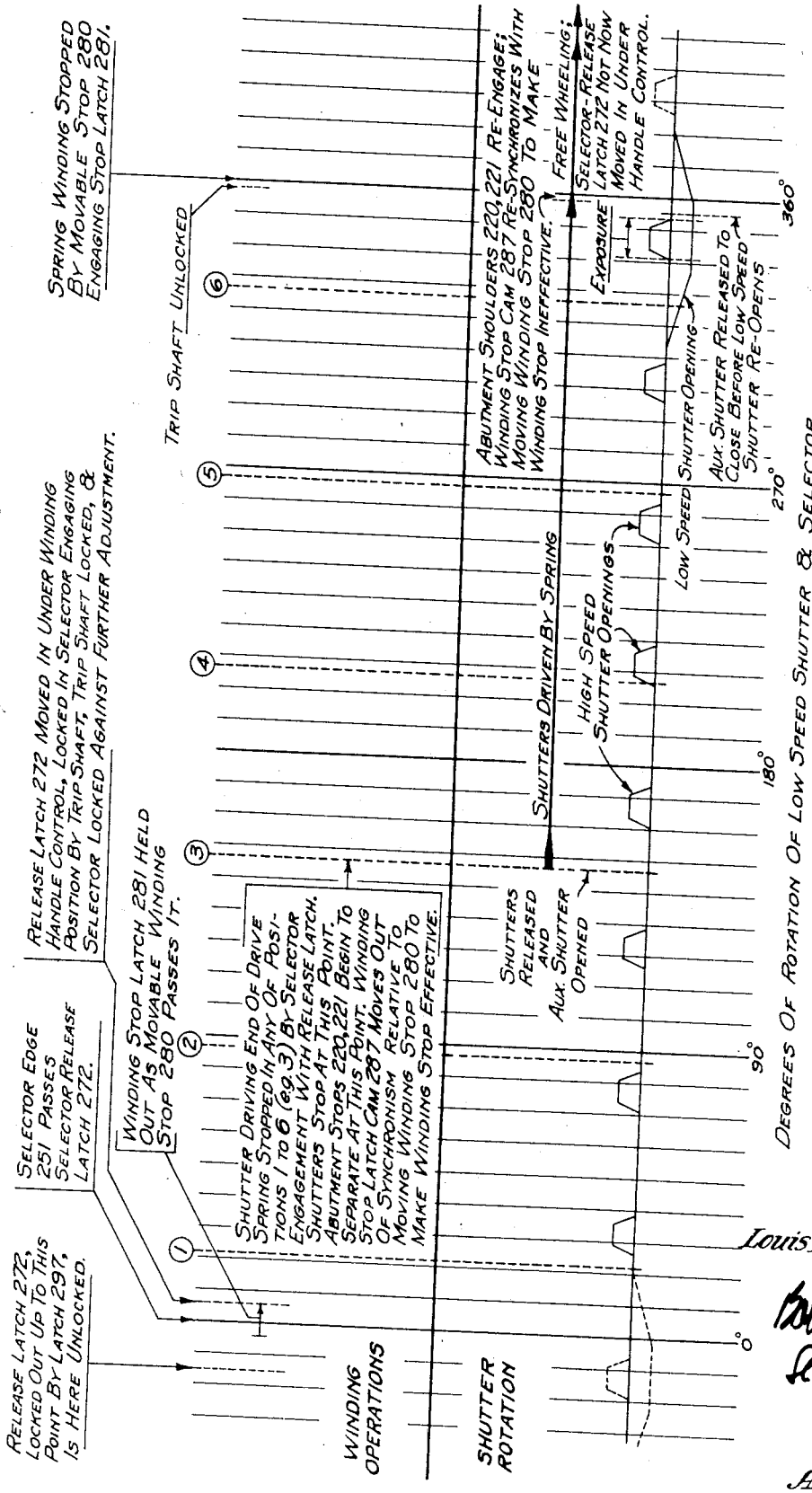
Fig. 19 is a diagram of shutter operation.

The two sets of shutter disks overlie one another at the exposure aperture so that the openings in both sets must be over the aperture in order to effect exposure. The high speed shutter disks revolve some definite whole number of times faster than the low speed disks (a factor of eight is preferably selected for the present design) so that there is thus, illustratively, one low speed shutter opening for eight potential high speed shutter openings. The high and low speed shutter disks are so synchronized that the occurrence of each low speed shutter opening at the exposure axis coincides with the occurrence of every eighth high speed shutter opening at the exposure axis. If the auxiliary shutter 27 is out of register with the exposure aperture when such coincidence occurs, an exposure results. The operation is represented in the diagram of Fig. 19, where the angular rotation of the shutters is measured horizontally and areas of the shutter openings are measured vertically. The 360° cycle of operation indicated represents one revolution of the low speed shutter disks and one low speed shutter opening, and eight revolutions of the high speed shutter disks with eight potential high speed shutter openings. As indicated, the low speed shutter opening occurs at the end of the 360° cycle, and coincides with the last high speed shutter opening of the series.

Preferably, and as here shown, each shutter aperture is elongated somewhat in a direction circumferentially of the disk, is of a width dimension $w$ substantially equal to the diameter of the bundle of light rays corresponding to the largest iris opening of the camera, and is bounded at the ends by arcs of radii equal to $w/2$.

The elongation of the high speed shutter apertures in the present design is preferably such that they each subtend a central shutter angle of about 95°, and of the low speed apertures is preferably such that each subtends a central shutter angle of about 65°. By employing shutter apertures of the central angles mentioned, and utilizing an eight to one speed ratio between high and low speed shutters, the high speed shutter opens and closes while the low speed shutter is at its maximum opening, and the low speed shutter opening does not overlap any portion of the preceding or succeeding potential high speed shutter openings. See the diagram of Fig. 19. At the same time, by using shutter apertures of the shape and central angles stated, I accomplish a high speed shutter efficiency of about 70%. That is to say, taking into account that the area of the shutter opening defined by the two apertures of the high speed shutter disks increases and then decreases progressively as the shutter apertures move into and out of register, while remaining constant at maximum opening for an intermediate interval, the shutter opening for the entire period from the time the apertures begin to open to the time they are finally closed is about 70% of what it would be if the opening were constantly at maximum size for the full period.

During the operation of winding up the driving spring, the rotating shutter unit is stopped and held by the selector mechanism (later described) in some selected position where the low speed shutter apertures are located somewhere between 0° and the position designated "Low speed shutter opening" in Fig. 19. In this position the low speed apertures have less than 360° movement before reaching the designated position at which exposure takes place. The shutters having been stopped, the driving spring is then wound through an angle commensurate with the angle through which the low speed shutter is to be driven to reach the designated position. (As will appear, spring winding is stopped at 360° in the diagram). The selector mechanism which holds the shutters is then tripped to release them to be driven to and through the exposure position. As will appear, a trip shaft preferably performs the tripping operation. These functions are here preliminarily described so that the general functions and timing of the auxiliary shutter may be preliminarily understood.

The auxiliary shutter 27, which comprises in this instance a shutter blade 32 on an arm 33 pivotally mounted at 34, is normally in alinement with exposure axis A, and thus normally prevents exposure even though there should be a coincidence of high and low speed shutter openings at the exposure axis. Just before the exposure is to occur, this auxiliary shutter is withdrawn, and it is released and caused to move back into light occulting position immediately the exposure is made, so that further exposure of the film is prevented as the mechanism coasts to an indeterminate stop, even though there may be subsequent registrations of both high and low speed shutter openings at the exposure axis. The synchronizing relation between the shutter disks and auxiliary shutter will be explained later in detail. It is sufficient at this point to say that the auxiliary shutter is, as shown here, moved to its open position by the tripping action that releases the shutters for driving, and is released to close in timed relation with the rotating shutters. This closure release takes place immediately after the high speed shutter openings have passed out of exposure register, at the point in Fig. 19 designated "auxiliary shutter released to close."

The shutter disks are driven from a gear 40 (see Fig. 6) on a gear sleeve 41 rotatably mounted on the lower portion of a vertical dead shaft 42 that extends downwardly through an aperture 43 in the bottom wall 22a of housing 22. Gear 40 meshes with the upper one of twin gears 44 (Figs. 3, 4 and 5) having a common hub 45 rotatable on axle 46 mounted top and bottom in horizontal upper and lower frame plates 47 and 48. The latter are supported at one edge on the top and bottom, respectively, of upper and lower channeled brackets 49 and 50, which are spaced by feet 49a on bracket 50 (see Fig. 18). Bracket 50 is suitably secured to the bracket feet 49a, and the two brackets are secured through spacing blocks 51 to the underside of frame plate 20. The space so provided between the two brackets 49 and 50 accommodates portions of the high speed shutter disks, as will be evident from Figs. 3 and 4. Plates 47 and 48 are further supported by means of suitable connecting tie rods and spacers, as indicated at 52, and upper plate 47 is secured to frame plate 20 as by means of screws 54 and spacers 55 (Fig. 3).

Top twin gear 44 drives upper high speed shutter disk 25 through a gear train (see Fig. 4) comprising gears 60, 61, 62, 63 and 64, the latter carrying the upper shutter disk. The axles of these gears, except 64, are mounted at the top in plate 47 and at the bottom in a sub-frame plate 65, as indicated. Lower twin gear 44 drives lower high speed shutter disk 25a through a gear train (see Fig. 5) comprising gears 70, 71, 72, 73, 74 and 75, the latter carrying the lower shutter disk. The axles of the gears 70 to 74 are mounted at the bottom in frame plate 48, and at the top in a sub-frame plate 76. The gear train driving the lower high speed shutter disk may be exactly like that driving the upper high speed shutter disk, except for the addition of an idler gear which reverses the relative direction of rotation of the lower disk. The two gear trains are such that both high speed shutter disks rotate at a speed ratio of two to one relative to driving gear 40.

Fig. 4a shows how the disk carrying gears 64 and 75 are mounted on a common axle 46a between plates 47 and 48, and how the gears are spaced apart by spacer 77 between their bearings 78 so as to space the disks with sufficient clearance to keep them out of mutual contact. The shutter disks are of thin sheet metal such as an aluminum alloy, so that their mass and inertia are as small as practicable.

Top twin gear 44 also drives the upper low speed shutter disk 26 through a gear train comprising gears 80, 81, 82, 83, 84 and 85, gear 85 carrying the shutter disk; and lower twin gear 44 also drives lower low speed shutter disk 26a through a gear train comprising gears 86, 87, 88, 89, 90, 91 and 92, gear 92 carrying the shutter disk. See Fig. 3 for the relative vertical locations of the gears in these trains. These gear trains give a four to one speed reduction from gear 44 to the low speed disks, and the lower train contains an extra idler gear which reverses the relative rotation of the lower disk. The axles of the upper gears are mounted in frame plate 47 and a sub-frame plate 94, and the axles of the lower gears are mounted in frame plate 48 and in a sub-frame plate 95. The mounting of the two disk-carrying gears, and the disk spacing, is the same as before described for the mounting of the high speed disks.

The several disks are so set on their carrying gears that the two exposure openings of each set reach a position of full registration centered on the exposure axis; and so that each full registration of the set of low speed openings occurs simultaneously at the axis with a full registration of the high speed openings.

II. *The shutter driving mechanism*

The shutters are driven by a drive spring 110 coiled about dead shaft 42 and connected at its lower end to drive the shutter driving gear sleeve 41 as will be explained. Shaft 42 is supported at its lower end in a bracket 111 secured to a lug 111b that extends downwardly from bottom housing wall 22a, the lower end of the shaft being keyed against axial displacement as at 111a. See Figs. 6 and 8. A head 112 is rotatably mounted on the upper portion of shaft 42, the upper end of the spring being anchored to a stud 113 set into head 112 as illustrated in Fig. 6. A spacing sleeve 114 disposed inside and extending substantially the length of coil spring 110 is press fitted at its top into the lower end of head 112, its lower end being press fitted onto a flanged disk 115, which is rotatably mounted on shaft 42. Sleeve 114 supports spring 110 against collapse or buckling when placed under substantial torsional strain, and also serves as a vertical support for the upper spring head 112. Disk 115 is supported by the illustrated series of bearings and spacer sleeves footing on the lower bracket 111 (Fig. 6).

Upper spring head 112 has an upwardly extending hub 120 rotatably journalled in a bushing 121 set in a supporting plate 122 (see Figs. 6 and 7), which is mounted in an opening formed in the upper wall 22b of housing 22.

Drive spring 110 is wound by rotating upper spring head 112. This may be done either by power or by hand operation; for simplicity a hand crank is illustrated for hand winding. The crank 132 is here shown as rotatably mounted on the upper end of shaft 42, being provided with a hub 133 rotatable on shaft 42 between upper collar 134 and the hub 135 of a ratchet disk 136 which is rotatable on the shaft 42 immediately below the crank. Ratchet disk 136 is engageable by a spring-pressed pawl 138 pivotally mounted at 139 on crank 132, pawl 138 being supported on the underside of the crank arm by a retainer plate 139a secured to the arm. The pawl transmits clockwise rotation from the crank to the ratchet disk.

Ratchet disk 136 has a depending clutch jaw 140 received between two circumferentially spaced jaws 141 and 142 which project upwardly from a disk 144 on the upper end of a sleeve 145 which is rotatably mounted on shaft 42. See Figs. 6, 13 and 3. A light coil spring 146 surrounding shaft 42 between disks 136 and 144 has its two outwardly bent end portions 147 and 148 (Figs. 3 and 13) in engagement with opposite sides of jaws 140 and 141, so as to hold said jaws normally in engagement. See Fig. 13. The function of spring 146 is to rotate ratchet disk 136, and the crank, backwardly (counterclockwise) relative to disk 144 when the crank is free. When crank 130 is rotated in a clockwise direction, ratchet disk 136 is driven by crank carried pawl 138, and jaw 140 carried by disk 136 separates from jaw 141 and moves into engagement with jaw 142 (Fig. 14) after which disk 144 is driven from ratchet disk 136. Upon crank 130 being released, spring 146 returns the disk 136 to the original relative position (Figs. 3 and 13).

The primary function of the two disks 136 and 144 and their relative movements is to control the operation of the selector mechanism so as to make that mechanism operative to cause spring winding only when the crank is being turned and to provide for the "free wheeling" of the whole rotating shutter and drive mechanism at other times. These disks also perform a function in timing the selecting operation of certain parts of the selector mechanism. These functions will be described in detail later along with the selector mechanism.

The lower end of sleeve 145 is keyed into the upper end of the hub 120 of upper spring head 112, as indicated at 150 (Figs. 6 and 7), so that rotation of crank 132 causes rotation of upper spring head 112, and therefore of the upper end of main spring 110 which is anchored to the latter.

Sleeve 145 is formed near its lower end with a gear 151, to the lower side of which is secured a ratchet wheel 152 (Figs. 6 and 7). A pawl 153 pivotally mounted at 154 on mounting plate 122, pressed into ratchet engagement by a spring 155, prevents reverse rotation of the upper end of the wound spring 110.

The lower end of spring 110 is anchored at stud 162 to a head 160 journalled on shaft 42. The tubular lower end portion 163 of head 160 is keyed at 164 to a gear sleeve 165 journalled on shaft 42. Head 160 and gear sleeve 165 are functionally a single member. The lower end of gear sleeve 165 is provided with a driving connection with the previously mentioned shutter driving gear sleeve 41. This driving connection preferably comprises a pair of engaging clutch jaws 166 and 167 (Figs. 6 and 8) formed on the lower end of gear sleeve 165 and the upper end of gear sleeve 41, respectively. A coil spring 168 surrounds shaft 42 with its two ends in engagement with the two clutch jaws 166 and 167, in the manner illustrated in Fig. 8, so that the spring tends to maintain the jaws normally in driving engagement to transmit clockwise rotation from the driving spring to gear 40.

In the spring winding operation the spring is first rotated as a whole before the selector mechanism acts to stop the lower end of the spring to cause spring winding. During this free spring rotation the shutters, geared to the lower end of the spring, also rotate. When that free rotation is suddenly stopped, sleeve 41 and the shutters have acquired some momentum. Spring 168 relieves the shutters of shock strain by allowing separation of clutch jaw 167 from clutch jaw 166. Spring 168 then serves to return the parts to the relative positions of Fig. 8 when the momentum has been dissipated. Aside from thus allowing shutter over-run to dissipate shutter momentum, gear sleeve 41 functions as if it were directly connected to, or a part of, lower spring head 160. As it is, gear 40 and the shutters always rotate with the lower end of the spring except when the shutters temporarily overrun.

III. The selector mechanism

Gear 151 on sleeve 145 at the upper end of the drive spring meshes with a gear 172, and the latter is fast with a smaller gear 173 that meshes with a gear 174 journalled on an upper end portion of a dead shaft 175 extending from top to bottom of housing 22 in parallelism with shaft 42. This upper train of gears always rotates with the upper end of the drive spring. Shaft 175 is supported at the top in upper housing wall 22c, and at the bottom in a bearing cap 176 secured to the lower wall 22a of the housing.

The gear 180, on the gear sleeve 165 which is connected to the lower spring head 160, meshes with a gear 181, and turning with the latter is a smaller gear 182 which meshes with a gear 183 surrounding the lower end portion of shaft 175.

This lower gear train always rotates with the lower or driving end of the spring. Gear 183 is secured to a flange 184 on a sleeve 185 which surrounds shaft 175 and is journalled at its lower end on shaft 175 by bearing 187. This bearing, resting on the hub of bearing cap 176, also acts as a thrust bearing to support sleeve 185 and the parts carried by it.

An inner sleeve 191 surrounding shaft 175 within sleeve 185 is fitted at its lower end within sleeve 185, and at a point intermdiate its length within the reduced bore 191a at the upper end of sleeve 185. This sleeve 191 has at its upper end an enlarged cup portion 192 receiving and supporting the outer race ring of a bearing 193 surrounding shaft 175. Sleeve 191 may preferably fit tightly in lower sleeve 185, so that whenever the lower sleeve rotates (which it does during both shutter driving and free wheeling) it will rotate on the well spaced bearings 187 and 193. The inner race ring of bearing 193 supports the inner race ring of the journal bearing for upper gear 174. That bearing also acts to support gear 174.

The downwardly facing shoulder 200 presented by the bearing cup 192 on the upper end of inner sleeve 191 is engaged by the upper face of a flange 201 on the upper end of an upper sleeve 202 that is journalled on inner sleeve 191 between cup 192 and a centrally bored disk 204 mounted on the upper end of lower sleeve 185. In the construction illustrated, disk 204 has a depending tubular hub 205 receiving and keyed to the upper end of sleeve 185. The lower end of upper sleeve 202 is counterbored to receive a bushing 206 and the upper portion of an abutting spacer bushing 207; and bushing 207 extends downwardly through the bore 208 of disk 204 and into a counterbore 209 in the upper end of lower sleeve 185.

The upper sleeve 202 is mounted for rotation relative to disk 204 and sleeve 185, but (Fig. 15) this rotation is confined to a few degrees by a stop lug 210 extending upwardly from disk 204 and received with suitable clearance within a notch 211 formed in the lower end of sleeve 202. Notch 211 provides two circumferentially spaced shoulders 212 and 213 engageable by the ends of stop lug 210, and a spring 214 coiled about sleeve 202, with its upper and lower ends anchored to disks 201 and 204, respectively, (see Figs. 3 and 15) tends to maintain the stop lug 210 against shoulder 212. That is, spring 214 tends to rotate upper sleeve 202 right-handedly with relation to the lower sleeve 185. In the condition of the mechanism shown in the drawings, when spring 214 is not overcome by spring 110, spring 214 rotates upper sleeve 202 relative to 185 through the small angle allowed. The purpose and action of this small movement will be explained later. For the time, this movement may be ignored. For the moment and for the purposes of understanding the general actions of the mechanisms, the two sleeves 185 and 202 may be considered as if they were integral or rigidly connected.

Disk 201 carries an upstanding abutment stop or shoulder 220, which is engageable with a similar abutment stop 221 extending downwardly from a plate 222 that is secured to the underside of gear 174. See Figs. 6 and 11. In the unwound condition of the mechanism, abutments 221 and 220 are in engagement with one another (see the dotted line position of stop 220 in Fig. 11). Drive spring 110 is preferably under some initial strain even when the mechanism is unwound, and the force exerted by this spring at such time maintains abutments 220 and 221 in engagement. The lower end of the drive spring tends to drive lower gear 183 clockwise, and also sleeve 185 and sleeve 202 and its abutment 220. The normal drive spring torque thus tends to move abutment 220 right-handedly against abutment 221 and hold them in that engagement as shown in dotted lines in Fig. 11. If crank 132 is rotated to drive the upper end of the drive spring right-handed, and nothing is done to hold the lower end of the drive spring, then main spring 110 will simply be revolved as a whole, neither of its ends being held, and the gear train between the lower end of the spring and gear 183 will cause sleeves 185 and 202, and therefore abutment 220, to revolve, while at the same time the gear train between the upper end of the spring 110 and gear 174 causes the latter together with its abutment 221 to revolve at the same speed, abutments 220 and 221 remaining in engagement all the while.

It should be stated at this time that there is a four to one gear reduction between the upper and lower ends of drive spring 110 and the respective gears 174 and 183, so that the selector mechanism is gear-related to the winding crank and the driving spring in a one-to-four ratio. As has been stated, the high and low speed shutters are geared to the driving spring in respective two-to-one and one-to-four ratios; so their geared ratios to the selector mechanism are, respectively, eight-to-one and one-to-one. When the whole mechanism is rotated freely, as above stated, the shutters of course rotate with it in the ratios stated; but when the lower end of the drive spring is held, by functions in the control mechanism to be explained, the shutters are also held stationary.

Figure 2:
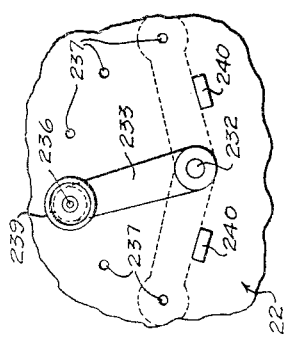
Fig. 2 is a detail taken in accordance with arrows 2—2 on Fig. 1.

Splined on sleeve 185 is a circular rack gear 230, meshing with an operating pinion 231 mounted on a shaft 232 which is journaled in housing 22 and has on one end an operating crank 233 (see Figs. 1, 2 and 3). Crank 233 has a spring pressed pin 236 which can be withdrawn by operation of head 239 and registered in any one of the spaced holes 237 in the adjacent casing wall. Stops 240, or any other suitable means, limit the adjusting movement of crank 233 and rack 230.

Operation of crank 233 thus rotates pinion 231 to elevate or lower rack 230. The upper end of the rack is formed with an outwardly extending annular flange 245, to which is secured a winding tension selector 246. This selector 246 has a cylindric wall 248 formed at the top with a step like formation providing a series of circumferentially spaced stop shoulders 250 at progressively higher elevations (considered in a counter-clockwise direction circumferentially) there being six such shoulders in the illustrated embodiment. See Figs. 6 and 12. There is a vertical drop-edge 251 between the last or highest and the first or lowest of the shoulders 250, as will be clear from inspection of Figs. 3 and 6.

To the right of shaft 175, as viewed in Fig. 6, are three vertical shafts 260, 261 and 262, positioned as illustrated in Figs. 9 to 12. These shafts are journaled in suitable bearings carried by a pair of vertically spaced mounting plates 265 and 266 that are secured to housing 22 in suitable manner.

The release shaft 260 carries at the bottom a selector engaging arm 270 shaped at the tip for engagement between the teeth of rack 230; rotation of shaft 260 moves arm 270 between positions of engagement and disengagement with the rack 230. Vertical adjustment of rack 230 must be made with arm 270 swung out of engagement therewith, and after rack 230 is vertically positioned, and arm 270 has then been moved into proper engagement with it, the rack and selector 246 are locked against further vertical movement. See Fig. 12 for the two positions of arm 270. Arm 270 registers with the spaces between the rack teeth in positions of the rack in which the plunger pin 236 of adjustment crank 233 is in register with holes 237. If such registration does not exist, arm 270 will strike the ends of the rack teeth and will not move into locking engagement with the rack. When that registration does exist, one or another of the selector shoulders 250 is at the proper elevation to be engaged by the selector stop and release latch 272 which moves with arm 270. The general functions of arm 270 are to prevent engaging movement of the selector and release latch unless selector 246 has been properly adjusted; and to prevent any further adjustment movement of the selector after operation of the mechanism has commenced and arm 270 and latch 272 have moved to engaging position.

Release shaft 260 carries, just above mounting plate 266, a selector stop and release latch 272, conveniently hereinafter referred to simply as the release latch. Correspondingly, the shaft 260 carrying latch 272 is conveniently designated the release shaft, although its function also includes the operation of latch 272 to engage and stop the selector 246. Release latch 272 has a hook portion 273 at the end adapted, when the latch is swung from the dotted line to the full line position of Fig. 12, to engage the selected one of the stop shoulders 250 on the selector 246, it being understood that vertical adjustment of rack 230 in the manner above described brings the several successive shoulders 250 successively to the level of release latch 272. See Fig. 6 which shows the relative level of latch 272. This figure and Fig. 12 show the selector and the latch, in full lines, in position where the latch has engaged the third lowest shoulder 250 on the selector. Arm 270 and release latch 272 are so positioned on shaft 260 that the release latch moves into the selector stopping position of Fig. 12 as the arm 270 moves into engagement with rack 230, so that the same rotation of shaft 260 locks the rack and the winding tension selector against further vertical adjustment and throws the release latch 272 into position to engage the selected stop shoulder 250 on the selector during the subsequent rotation of the selector. When the selector 246 and release latch 272 have been set, operation of the winding crank will first rotate the drive spring and selector mechanism bodily until latch 272 engages a winding selector shoulder. The latch then holds the sleeve 185 and 202, and the lower end of the drive spring, against further rotation while the drive spring is wound up by an amount which depends on the position of the parts when latch 272 engaged the selected shoulder 250. The stop which limits the spring winding operation is relatively a fixed position stop. The amount by which the drive spring is wound depends solely on the position of the parts when winding begins; selected by operation of selector 246.

The advance end 280 of stop plate 222 on upper gear 174 serves as a winding stop, being engageable in a predetermined position of rotation of gear 174 with the hooked end of a winding stop latch 281 which is mounted on shaft 261 (Fig. 11). Latch 281 is provided with a projection 282 working in a slot in a block 285. Spring 283 seated in that block acts to urge the latch to move to latching position. A stop 284 formed on the hub end of latch 281 is engageable with block 285 to limit movement of the latch past its stop engaging position.

To avoid engagement between the winding stop latch 281 and the winding stop 280 at any time except when the winding tension selector 246 has been engaged by the release latch, the disk 204 on lower sleeve 185 is furnished with a cam plate 287 (Figs. 6 and 12) which engages a roller 288, carried by an arm 289 on shaft 261, and rocks shaft 261 to withdraw stop latch 281 to the dotted line position each time the stop 280 passes by. When, however, the winding tension selector 246 has been stopped by release latch 272 and spring winding has commenced the cam plate 287 is of course stopped with it, and winding stop latch 281 accordingly remains in position to engage stop 280 and so stop the winding of the spring. Cam plate 287 is only effective to disable the winding stop latch 281 when the cam plate is in a position synchronized with the moving winding stop 280; that is, when abutments 220, 221 are in engagement.

The general function of the parts just described is to make the winding stop inoperative whenever abutments 220, 221 mutually engage, and other control mechanisms may be used instead of that described, which is merely typical. And it may also be remarked that winding stop 281 may by its movements perform additional functions in a complete camera mechanism, not necessary to be described here.

Preferably the movement of release latch 272 to selector stopping position (full line position of Fig. 12) is timed by control mechanism described later to occur just after the vertical edge 251 of the selector has passed the location of the release latch. The stop shoulders 250 pass successively below the release latch until the particular shoulder adjusted to the level of the release latch arrives at the release latch and is stopped thereby. The winding stop 280 and winding stop latch 281 are so positioned with relation to selector edge 251 that the stop 280 will not engage latch 281 until nearly 360° of travel (preferably about 354°) following projection of the release latch into selector stopping position. After projection of the release latch into the path of the selector, the selector revolves until the selected stop shoulder 250 reaches and engages the release latch. This action stops the rotation of the selector, the lower end of the drive spring, sleeve 202 and abutment 220. Continued operation of the winding crank 130, then continues to rotate the upper end of the spring and the upper gear 174, so that the abutment 221 moves away from abutment 220 in a clockwise direction. Finally, after about 354° of rotation of the winding stop following projection of the release latch into the path of the selector, the winding stop is engaged by winding stop latch 281, and winding of the spring is arrested. The tension in the spring 110 will now depend upon which one of the shoulders 250 of the winding tension selector was in position to engage the release latch 272, or in other words, upon how far the upper end of the spring was turned to bring stop 280 up against stop latch 281 after release latch 272 engaged the selected shoulder 250. Fig. 12 shows release latch 272 engaging a selected stop shoulder on selector 246, and that figure and Fig. 11 show the position of the parts when spring winding has proceeded to its end, stop 280 and abutment 221 have rotated clockwise away from abutment 220 through an angle which has been determined by the selected selector shoulder 250, and winding stop 280 has finally brought up against stop 281. The whole mechanism is then held in this position by the release latch 272 and the ratchet pawl 153; the former preventing clockwise rotation of the lower end of the drive spring and of the selector mechanism, and the latter preventing retrograde movement of the upper end of the drive spring and of gear 174 and abutment 221.

Upon subsequent withdrawal of release latch 272 the selector mechanism will be freed to rotate and allow the lower end of the spring to drive the shutters through an angle determined by the angle through which abutment 220 rotates clockwise to reach the dotted line position in Fig. 11, against abutment 221.

A summary of operation of the mechanisms so far described may now be made.

When the mechanism is at rest after a previous operation, the shutter disks may have any position relative to the exposure aperture, due to the fact that the mechanism has finally come to rest at the end of a free wheeling run. Normally, the first operation is to set the selector 246 to the exposure desired. Then the winding crank is operated. Disregarding for the moment the initial relative movement between the scalloped disks 136, 144, rotation is thus transmitted to the driving spring. As stated before, the initial tension on the driving spring holds abutments 220, 221 together, and in this condition the driving spring, the upper and lower gear trains, and the rotatable selector mechanism form a closed train revoluble as a unit without any relative rotation between its parts. For the moment, spring 214 and the limited freedom between lower sleeve 185 and upper sleeve 202 may be disregarded. The tension of the drive spring, stronger than that of spring 214 and acting against it, throws jaw 210 by relative clockwise rotation against shoulder 213, in this condition of the mechanism.

Thus, at first, and until rotation of selector 246 is stopped, the whole closed train is merely rotated. If the selector has not been set in proper position to allow the selector and release latch 272 to move in, this free wheeling operation may go on indefinitely. But, assuming that the selector has been properly set to allow latch 272 to move in to engage a selector shoulder, then the following sequences occur as soon as latch 272 is moved in, or released to be moved in by a spring.

Regardless of when latch 272 is released to move in (it is only preferable that it be timed to move in directly after selector edge 251 has passed it) the selected selector shoulder 250 will then engage it the first time that shoulder comes around after the latch moves in. The immediately previous passage of selector edge 251 past the latch corresponds to 0° in the diagram of Fig. 19. In this position of the mechanism the shutter disks have just completed an exposure registration with the exposure aperture, but with auxiliary shutter 27 closed, and will not make another exposure registration until near the end of the 360° cycles. Latch 272 then engages the selected shoulder after rotation through the selected angle following the last previous shutter disk registration.

Due to the fact that the separable abutments 220, 221 are located in the rotatable train between the selector and the upper end of the drive spring, and to the fact that the forward abutment 221 (forward in the direction of clockwise rotation) is connected to the upper end of the spring so that the stops separate by relative forward movement of that one, the shutters are now held stationary at the selected position in the 360° cycle while the upper end of the drive spring rotates on to the end of the cycle where it is stopped by the winding stop latch 281 and held from backing up by pawl 153.

Release of the mechanism for effecting an exposure then consists essentially in opening the auxiliary shutter and in moving latch 272 out of selector engagement. The auxiliary shutter can be opened at any time before exposure. Its preferred operation will be explained later; its action is such that, at the moment, it may be considered as if it were opened by hand at the time of or before releasing latch 272. If latch 272 is then released and held out (the control mechanisms for automatically holding the latch out as well as for timing its movement inward will be later explained) then the following operations take place.

The released lower end of the driving spring drives the shutters forward from their stopped position. The shutters are thus accelerated, and the speed which they reach depends upon the strain that was put in the spring 110 and the angle through which the shutters are driven, both these factors having been determined by the particular selector stop shoulder 250 which was selected and utilized to arrest rotation of the lower end of the spring. The spring reaches its relatively unwound condition at the time abutment 220 re-engages abutment 221, the shutters having at this time attained maximum speed for the particular selector shoulder 250 that was used. Re-engagement of abutments 220, 221 takes place in the diagram (Fig. 19) at 360°, if the small relative movement indicated in Fig. 15 be still disregarded. The timing of the mechanism is such that at this same time, or preferably just shortly before, the high and low speed shutter openings occur at the exposure axis (Fig. 19), and an exposure is had. Immediately after exposure the auxiliary shutter is closed by a time control mechanism (explained afterwards) which closes that shutter before the rotating shutters next again register in the ensuing free wheeling movement now to be described.

Just before abutments 220, 221 reengage, cam plate 287, which is then moving ahead to its normal synchronized relation to stop 280, lifts the winding stop latch 281 to free the upper parts of the rotary train for forward movement. See Fig. 19 which indicates that cam 287 lifts the stop latch just ahead of reengagement of abutments 220, 221. Abutments 220, 221 having come into reengagement, the momentum of the rotating parts of the mechanism is in part transferred to the previously non-rotating parts, and the then closed train begins again to rotate as a whole in free wheeling. Cam 287 being now in synchronized relation to moving winding stop 280, lifts the winding stop latch 281 on each revolution to clear stop 280. The mechanism continues to free wheel until its momentum is absorbed by frictional losses and by incidental energy expenditures such as that which is caused by cam 287 moving arm 289 and winding stop latch 281 (see Figs. 11 and 12) once each revolution. The rotating mechanism, including the rotating shutters, thus come to a final stop in an indeterminate position, as mentioned before.

If desired a brake may be provided to bring the rotating parts more quickly to a stop. As here shown, the stationary mounting plate 122 at the upper end of the driving spring supports springs 275 which engage a stationary friction washer 276 keyed at 277 to the plate and bearing against a friction washer 278 which is fast to the upper spring head 112. This friction mechanism exerts a light but constant frictional drag on the rotation of the upper end of the driving spring. Consequently it exerts that frictional drag on the mechanism only when the rotating train is rotating as a whole, which it does in free wheeling. During the period when the shutter is being driven by spring energy, the friction brake is inoperative, the upper end of the driving spring is then stationary.

The operation of the mechanism has so far been considered as if there were no movement freedom between lower sleeve 185 and upper sleeve 202, but as if the two sleeves were relatively rigid or integral. The reason for preferring a slight spring opposed relative movement between the two sleeves will now be explained. As stated before, the initial tension torque of drive spring 110 is greater than that of spring 214. Consequently, whenever abutments 220, 221 are in engagement, as when the mechanism is at rest or is free wheeling, spring 110 overcomes the torque of spring 214 and moves the lower sleeve 185 and its upper disk 204 and clutch lug 210 right-handedly with relation to upper sleeve 202. Under these conditions the clutch lug 210 engages shoulder 213 in Fig. 15. However, as soon as lower sleeve 185 has been stopped from rotation by the selector action, and the torque of the drive spring thus taken off spring 214, then as abutment 221 leaves abutment 220 in right-handed direction, spring 214 moves the upper sleeve 202 around in a right-handed direction until its shoulder 212 engages lug 210 which in then standing still with lower sleeve 185.

At the end of the shutter driving operation, the abutment 220 reengages abutment 221 by moving up on the latter in clockwise direction. At the time of that engagement, the right-handedly rotating abutment 220 more or less instantly imparts rotary momentum to the previously stationary upper train of gears and the upper end of the drive spring. The torque of drive spring 110 immediately tends to move lug 210 right-handedly in Fig. 15 into engagement with shoulder 213. Spring 214 however opposes that relative movement, as well as the reaction force on abutment 220 when it picks up abutment 221. The slight relative movement opposed by the spring 214 thus acts as a snubber on drive spring 110 to absorb at least a portion of the shock that would otherwise attend starting the upper parts of the mechanism into rotation, and thus takes shock off the whole mechanism as the whole mechanism starts free wheeling after exposure. Spring 168 takes the shock off the light thin shutter disks, but if spring 168 be not used, spring 214 will perform that function. Other than for this desirable function of eliminating the effects of shock, the two sleeves 185 and 202 might, in full effect, be integral.

The slight relative movement involved in this action of absorbing shock has only one effect, and is immaterial on the timing of action of the whole mechanism. When upper sleeve 202 and its abutment 220 are moved slightly right-handedly by the action of spring 214 at the beginning of the spring winding operation, abutment 220 is thus put in a position relative to lower sleeve 185 a few degrees in advance of what its position would be if the abutment were fixed relative to lower sleeve 185. Abutment 220 consequently engages abutment 221 at the end of the shutter driving operation a few degrees before the then driven part of the mechanism reaches the 360° point in the diagram of Fig. 19. It is through the last few degrees of rotation of lower sleeve 185 that driving spring 110 is snubbed and the shock absorbed, the lug 210 of Fig. 15 finally coming into engagement with shoulder 213 of upper sleeve 202 at the 360° point in Fig. 19. But the arrangement is such that this relative shock absorbing movement all takes place in Fig. 19 after the shutters have been rotated through their position of complete closure of the exposure opening, which is shown as taking place at about 354°.

IV. Control and actuation of the selector mechanism and free wheeling

The description so far has been based on an assumption that the selector stop and release latch 272 may be operated in any desired or suitable manner, even by hand. I will now describe the preferred actuating and control mechanisms by which the release latch is automatically controlled, locked in selector engaging position subject to manual or other release, automatically moved to selector engaging position, and automatically held out to allow the ensuing free wheeling. The primary purpose of these mechanisms is to actuate the latch automatically and at the same time automatically to provide for free wheeling. Incidentally these same mechanisms time the movement of the latch into selector engaging position.

In the present preferred design of the mechanisms, release latch 272 has a tail piece 330 formed at its extremity with an arcuate edge 331 whcih is preferably centered on the center of trip shaft 262 when the release latch is in the full line position of Fig. 12. A locking arm 332 rigidly mounted on trip shaft 262 has a correspondingly arcuately faced lug 333 adapted to ride over the arcuate edge of the latch tail piece when the latch is in position to engage the selector, full line position of Fig. 12. Locking arm 332 has an integral projecting lug 335, and spring 336 which is set in mounting block 337 presses against lug 335 to move locking arm 332 into locking engagement with the latch tail piece. The trip shaft is rotated to unlock and trip the release latch 272 by rotation to the dotted line position of Fig. 12, by means of a handle 262a (Fig. 6).

Spring 338 mounted in block 339 acts against latch tail piece 330 in a direction to move release latch 272 to and hold it in its release position (dotted lines in Fig. 12).

As stated before, the release latch might be moved to its selector engaging position by any means, and at any time after the selector has been properly adjusted. It is preferred however to make this selector engaging movement of the latch automatic; and in the present preferred design of the mechanisms it is preferred to utilize the cranking action preliminary to spring winding to control or actuate the movement of the release latch into selector engaging position. By thus utilizing the preliminary cranking action as the controlling means for that latch movement, it will be seen that provision is made so that, except at a time during actual cranking, no force is exerted on the release latch tending to move it into selector engaging position, and consequently that the free wheeling action is allowed without any liability of the latch reengaging the selector.

Release shaft 260 has the hub 290 of a rocker arm 291 rotatably mounted on its upper end. See Figs. 1, 6, 13 and 14. The lower edge of hub 290 has a downwardly projecting clutch jaw 292 (Figs. 6, 13, 14) which is engageable with an upwardly projecting clutch jaw 293 on a hub 294 tightly mounted on release shaft 260.

Rocker arm 291 (see Figs. 13, 14) is connected by link 310 with a swinging arm 311 which is pivotally mounted at 312 on the housing top. Arm 311 carries a roller 315 bearing on the periphery of disk 144 which, as will be remembered, always rotates with the upper end of drive spring 110. Roller 315 also overlies a portion of the periphery of disk 136 (Fig. 6), and disk 136 is preferably slightly smaller in diameter than disk 144 for a reason later to be stated. Disk 136, it will be remembered, is the one which is rotated right-handedly from crank 132 through the medium of a ratchet, and has a certain amount of lost motion with relation to disk 144.

Roller 315 is pressed against disk 144 by a tension spring 316. The peripheries of disks 136 and 144 are provided each with a single depression or scallop, 318 and 319, respectively. When these scallops are registered (Fig. 14) roller 315 may enter and thus permit movement of arm 311 toward the left under the influence of spring 316.

Spring 146 acting between disks 136 and 144 normally holds the disks in the relative positions shown in Fig. 13, with clutch jaw 140 against clutch jaw 141, and scallops 318 and 319 out of mutual register so that roller 315 cannot enter either scallop because it then rides on the periphery of one disk or the other throughout the revolution of the disks.

Initial rotation of winding crank 132 moves clutch jaw 140 around in a right-handed direction to engage clutch jaw 142, and moves the two scallops into register. Then, if the registered scallops are not under roller 315, further right-handed rotation of both disks 136 and 144 from the position in which disk 144 happened to stop after the previous operation will bring them both into register with roller 315, and spring 316 may then move arm 311 to the position of Fig. 14. This spring impelled movement of arm 311 may occur on the first registry of the registered scallops with roller 315 or on any subsequent registry which occurs during the rotation of the registered scallops under power from the crank. A timing mechanism, to be described, determines when this action will take place to move release latch 272 into selector engaging position. Without the timing mechanism, the action would take place the first time the registered scallops register with roller 315. With the timing mechanism, the action now to be described may take place at any one of several successive registrations of the scallops with roller 135.

As will be pointed out later, release latch 272 is left in the dotted line position of Fig. 12, disengaged from the selector, at the end of a previous completed operation. Fig. 13 shows the corresponding position of clutch lug 293. When spring 316 moves roller 315 into the registered scallops and moves arm 311 and link 310 to the left, as in Fig. 14, clutch lug 292 is moved right-handedly against clutch lug 293 to rotate release shaft 260, release latch 272 and the selector locking arm 270, to the full line position shown in Fig. 12. Spring 316 is strong enough to overpower the release latch spring 338.

Once the release latch is moved to its selector engaging position, and locked in that position by the locking arm 332 on trip shaft 262, subsequent oscillations of rocker arm 291 and clutch lug 292 due to the intermittent entry of roller 315 into the registered scallops, during the time that winding crank 132 is being subsequently rotated to wind the spring, will have no effect on release shaft 260, because of the lost motion between lug 292 and lug 293.

Hub 294 fast on release shaft 260 (see Figs. 6 and 9) carries a latch lug 295 engageable by latch hook 296 of a latch 297 which is loosely pivotally mounted on shaft 261. Latch 297 has a camming edge 299 engageable once each revolution of gear 174 by an actuating pin 300 mounted on the upper side of that gear. (In Fig. 6 pin 300 is shown in dot-dash lines, as being on the near side of the sectional plane of that figure.) Latch 297 has a projection 301 working in a slot in block 285 (see also Fig. 3), engaged by spring 303 seated in the block and acting to move the latch in a direction to engage the actuating pin 300, and to move into latching engagement with latch lug 295. Latch lug 295 is so located on release shaft 260 that when engaged by latch 297 (dotted line position to Fig. 9) the release latch 272 and selector locking arm 270 are held in the retracted dotted line positions of Fig. 12. Engagement of latch 297 by pin 300 moves that latch to the full line position of Fig. 9, thus releasing latch lug 295 and freeing the release shaft 260 to be rotated right-handedly by the mechanisms previously described, to move release latch 272 and locking arm 270 into the full line operating positions of Fig. 12.

Pin 300 is so positioned on gear 174 that latch 297 frees the release shaft for right-handed rotation at a time when the vertical edge 251 of selector 246 has just passed the release latch hook 273, abutments 220 and 221 then being in engagement. (Fig. 9 shows the position at which latch 297 has just released; which position is substantially the same as that shown in the other figures—the position in which gear 174 has made one more complete revolution and has been stopped by the winding stop.) Vertical edge 251 of the selector passes the release latch hook approximately or precisely at the 0° point in the diagram of Fig. 19; and the release shaft is freed by latch 297 a few degrees later, about 6° in this particular design.

Disks 136 and 144 revolve four times for one revolution of gear 174. The scallops on those disks are so positioned that they register with roller 315 in synchronism with the releasing action of latch 297. Latch 297, blocking the right-handed rotation of release shaft 260 until selector edge 251 passes the release latch hook for the first time, it will be evident that the registered scallops may pass roller 315 as many as several times before latch 297 unlocks the release shaft to move release latch 272 into operative position immediately behind the selector edge 251, all depending upon where the mechanism happened to stop at the end of the preceding operation.

The purpose of utilizing the timing mechanism shown in Fig. 9 is to prevent release latch 272 from dropping in at a time when its hook end would be spring-pressed against the outer periphery of selector 246 and then pressurably ride the selector until its hook drops over edge 251. As the mechanism is preferably designed, the release latch is moved into operative position just prior to the arrival of the first or lowest selector stop shoulder 250 at the radial plane of the release latch hook 273.

It will be remembered that selector locking arm 270, and therefore release latch 272, cannot be moved into their operative positions unless selector rack 230 is properly adjusted and registered for proper engagement of the release latch with one or the other of selector shoulders 250. Seeing that locking arm 270 and release latch 272 are moved into their operative positions by spring pressure, arm 270 will block the inward movement of latch 272 unless arm 270 can enter properly between the teeth of the selector rack.

As soon as release latch 272 has moved in to its operative position, locking lug 333 on trip shaft 262 immediately locks the release latch in its operative position. Continued rotation of the winding crank then brings the selected one of selector shoulders 250 up against the release latch hook, and then completes the winding of the drive spring, as before described. The mechanism is then in condition for subsequent exposure release as before described, by rotating trip shaft 262.

Preferably, a means is provided for positively preventing rotation of trip shaft 262 to trip the release latch 272 until drive spring 110 is fully wound, thus assuring that the spring tension for which the selector 246 was originally set is actually reached and used. For this purpose, as here shown, there is tightly mounted on trip shaft 262 a latch lug 340 (see Fig. 10) engageable by the hook end 341 of a trip shaft latch 342, the latter being freely pivotally mounted on shaft 261. Latch 342 has a projection 344 receivable in a slot 345 of block 285, and engageable by a spring 346 which urges the latch to move into locking engagement with trip shaft lug 262. A tail piece 347 on the latch is engageable with the side of block 285 as a stop. The described left-handed rotation of trip shaft 262 as locking arm 332 moves into locking engagement with release latch 272 moves latch lug 340 on the trip shaft from the dotted line to the full line position of Fig. 10, whereupon spring 346 moves latch 342 into locking engagement with lug 340 (full line position of lug 340 and dotted line position of latch 342 in Fig. 10). The latch 342 has a camming edge 348 engageable by the pin 300 on gear 174, and is movable by said pin from the dotted line to the full line position of Fig. 10, so as to disengage latch hook 341 from lug 340, and thus unlock trip shaft 262 for rotation in a right-handed direction. This occurs just at the time the spring 110 is fully wound; simultaneously with, or just prior to, engagement of stop 280 with winding stop latch 281 (Fig. 11).

The sequence of operation is as follows: Assuming that the selector has been properly set, then as crank 132 is turned, release shaft 260 is rotated upon passage of registered scallops 318 and 319 past roller 315 and simultaneous engagement and movement of latch 297 by pin 300 (Figs. 9 and 14). This moves release latch 272 to its advanced, selector stopping position, and the latch is immediately locked in that position by trip shaft lock arm 332 (Fig. 12). The locking rotation of trip shaft 262 causes locking of the trip shaft by latch 342 (Fig. 10), releasable only by spring winding being subsequently completed. At the time the release latch and trip shaft are locked the drive spring 110 is still entirely unwound (except for its initial strain), the abutments 220 and 221 are still in engagement, and the winding tension selector 246 is in a position with its first or lowest stop shoulder 250 in a position immediately coming on to the release latch (though of course not necessarily adjusted to the level of the release latch). Further operation of crank 130 then brings selector 246 around until the stop shoulder 250 adjusted to the level of the release latch engages the latter, and the rotation of selector 246, the abutment 220, and the lower end of spring 110 is then stopped. Continued cranking then continues to turn the upper end of the spring, winding it up, and the abutment 221 during this time separates from abutment 220. This winding operation is finally stopped as stop 280 engages winding stop 281 (full line position in Fig. 11). At this same time, as previously stated, trip shaft latch 342 is retracted by pin 300, unlocking trip shaft 262 (Fig. 10). The mechanism is then released by rocking trip shaft 262 right-handedly. Such movement of trip shaft 262 removes trip shaft arm 332 from its locking engagement with the projection 339 of release latch 272, whereupon release latch 272 is immediately moved by its spring 338 to its dotted line or release position (Fig. 12). The hook end 273 of release latch 272 engages stop shoulder 250 along a line which is radial of the center of rotation of selector 246, and the center of rotation of release latch 272 being outside a line drawn tangent to the selector at the location of the engaged stop shoulder, it will be evident that the selector itself, acted upon by the pressure of the tensed spring 110, exerts a counter-clockwise moment on release latch 272, tending to throw the release latch out of engagement with the selector once the release latch is disengaged by the lock arm 332. Release latch 272, acted on both by this counter-clockwise moment exerted by the selector, as well as by its spring 338, thus moves from the full line to the dotted line position of Fig. 12, releasing selector 246 and the lower end of the spring for rotation. The shutters are then driven from the lower end of the spring as before described, abutment 220 rotating with the selector and with the lower end of the spring to finally strike abutment 221 and so to set gear 174, and therefore gear 151, disks 144 and 136, and the upper end of spring 110 into rotation. Free wheeling operation then takes place as before described, and the whole rotating mechanism stops indeterminately.

Normally it is to be expected that the winding crank will have been released before the mechanism is tripped; but it is immaterial whether the crank is allowed to go free or is held. If the crank is freed at the end of spring winding, spring 146 will immediately rotate upper disk 136 and the crank to a position where the scallops are out of register, or at least tend to do so. In any case, as disk 144 starts to rotate forward in the free wheeling operation, spring 146 (and also the drag of the crank pawl on upper disk 136) cause that upper disk to move relatively behind lower disk 144 and the scallops thus are moved and kept out of register during free wheeling. This prevents roller 135 from entering into the scallops during the free wheeling operation, and so spring 316 cannot act to move release latch 272 into engagement with the selector although pin 300 is periodically unlocking the release shaft on each of the free wheeling revolutions of gear 174. It is to assure the reverse rotation of disk 136 relative to disk 144, to the relative position of Fig. 13, that the disk 136 is preferably made just slightly smaller in diameter than disk 144, thereby avoiding any possible frictional drag between roller 135 and the periphery of disk 136.

After tripping, the release latch remains in its release position and the trip shaft 262 remains in its position rocked toward the right by reason of engagement of the end of tail piece 330 of release latch 272 with trip shaft arm 332 (see dotted line position, Fig. 12) until the release latch is again advanced to selector stopping position in a subsequent operation.

The counter-clockwise selector releasing movement of release latch 272 rocks release shaft 260 back to a position in which its latching arm 295 is again engaged by release shaft latch 297 (Fig. 9), so that the release shaft is again locked, in readiness for the next winding operation to begin.

The operations of the mechanism have been described for hand winding and tripping. Winding and tripping may however be by power actuation, automatically controlled and timed, or controlled by remote control. Any such power actuation and control may be used as may be convenient or necessary for actuation of the shutter mechanism in any desired system. With such matters my invention is not directly concerned, nor is it limited in that regard.

V. *Auxiliary shutter actuation*

So far, the descriptions of operation have assumed that auxiliary shutter 27 is moved to open position at any time previous to the exposure registration of the rotating shutters, and is then closed before the low speed shutter disks have again come to exposure position. For automatic operation of the auxiliary shutter, it may be opened by virtue of any action that takes place in the mechanism before actual exposure, and it may be closed by any action taking place in timed relation to the exposure operation. Preferably the auxiliary shutter is opened by an action which takes place before shutter driving commences, so as not to place a load on the mechanism during the actual driving operation. Thus the auxiliary shutter is preferably opened by some action connected with release of the mechanism for shutter driving; and in this present preferred design it is opened by the releasing action of the trip shaft.

It may here be remarked that one reason for driving the low speed shutters through an angle of less than 360° is that they do not then cross the exposure axis before exposure is intended to occur. Consequently the automatic opening of the auxiliary shutter does not have to be actuated by the mechanism while it is driving the shutters, and the auxiliary shutter can thus be opened by any operation which occurs before driving starts.

Arm 33 of auxiliary shutter 27 is secured to a flange 98 on the lower end of a hub 99 that is rotatable on an axle 100 secured at the top to and extending downwardly from frame plate 47, as illustrated in Fig. 17. Hub 99 is formed at the top with an upward arcuate extension 101 concentric with the hub. See Figs. 1, 16 and 16a.

This extension 101, which serves as the member through which the auxiliary shutter is drawn aside, passes through an arcuate slot 102 in frame plate 47, and through aperture 103 in frame plate 20, so as to rise above the plane of the latter, as appears in Fig. 17. A tension spring 104 connected between extension 101 and a post 105 secured to frame plate 47 holds the auxiliary shutter 32 normally in a position alined with exposure axis A, the arcuate extension 101 engaging the end of slot 102 as a stop in such position (see Fig. 4).

In accordance with the present preferred embodiment of the invention, the auxiliary shutter is moved to one side during and by virtue of the initial rotation of trip shaft 262 in the action of tripping the release latch of the mechanism. Thus, as shown in Fig. 6, the lower end of trip shaft 262 carries a rock arm 350 (see also Fig. 16), which is pivotally connected at 351 with a shutter setting arm 352. Arm 352 has at its forward free end a hook portion adapted for engagement of one edge 353 of the arcuate lug 101 of shutter hub 99. This hook portion, as here shown, comprises a lug 354 on the underside of the arm at its forward extremity, formed with a concave surface 355 adapted for engagement with the lug edge 353. Lug 354 is here shown as slidably supported on frame plate 20, and the arm 352 is confined against separation from plate 20 by an overlying guide 356.

A roller 370 mounted on frame plate 20 and a coacting cam surface 371 on arm 352 guide the arm in its various movements, and arm 352 is held against the roller by means of a spring 372.

As stated before, auxiliary shutter 27 is normally in the light occulting position of Fig. 1, being yieldingly held in such position by its spring 104 (Fig. 17). When the trip shaft 262 rotates in a counterclockwise direction, to engage its lock arm 333 with release latch 272 at the beginning of the spring winding operation, the arms 350 and 352 move to the position of Fig. 1. In the course of such movement, the concaved forward corner 380 of arm 352 rides against the arcuate shutter operating lug 101. As the position of Fig. 1 is approached, the hook surface 355 moves beyond edge 353 of lug 101, and the deep portion 381 of cam surface 371 permits arm 352 to move laterally, so as to move surface 355 beyond the lug edge 353, arm 352 moving partially over the arcuate member 101 (Fig. 1).

As trip shaft 262 is subsequently rotated in a clockwise direction to trip the mechanism to start the shutter drive, the first part of the movement draws arms 350 and 352 to the full line position of Figs. 16 and 16a, surface 355 on arm 352 pulling the arcuate shutter operating lug 101 around to the position illustrated in said figures, and causing the auxiliary shutter to swing aside, as indicated. As the full line position of Fig. 16 is reached, the hook end 390 of an auxiliary shutter latch 391 enters a notch 392 in the edge 353 of the arcuate lug 101. The end surface 401 of latch hook 390 is concaved to conform to the curvature of arcuate lug 101, and bears against the latter under the influence of a spring 402 pressing against arm 398 (Fig. 16) during movement of lug 101 to latching position. In the meantime, the cam surface 371 on arm 352 has been moving arm 352 laterally, and before the time the dotted line position of Fig. 16 is reached, the cam shoulder at 393 engaging roller 370 will have moved surface 353 clear of the lug 101. The auxiliary shutter is thus moved to open position, and latched open by latch 391, before arms 350 and 352 reach their final position (dotted lines in Fig. 16). That final position corresponds to the position of trip shaft 262 in which release latch 272 is released to start the shutter driving operation (dotted line positions in Fig. 12).

Auxiliary shutter latch 391 has a hub 396 rotatable on a shaft 397 set into the housing structure (Figs. 1 and 16), and fast with hub 396 is an arm 398 carrying a roller 399 adapted to be engaged and moved to effect release of latch 391 by a cam 400 secured to the underside of flange 184 of gear 183 (see Figs. 6 and 16). Gear 183, it will be remembered, is permanently timed with relation to the rotating shutters. The cam 400 is so located on gear flange 184 as to engage roller 399 and swing latch 391 out of engagement with arcuate member 101 just after the shutter exposure opening has closed, thereby releasing the auxiliary shutter to return to closed position under the influence of its spring 104 before the low speed shutter re-opens on the next revolution, and assuring that there will be no further exposures of the film as the mechanism coasts to a stop, even though there may be several additional coincidences of high speed and low speed shutter openings at the exposure axis. The time of releasing shutter latch 391 is indicated diagrammatically in Fig. 19; just after the closure of that high-speed shutter opening which coincides with the low-speed shutter opening. This gives the auxiliary shutter a maximum period in which to swing closed before the next slow speed shutter opening occurs. The auxiliary shutter is stopped in its closed position by its lug 101 striking the end of slot 102 in plate 47.

Preferably, a means is provided for assuring that the auxiliary shutter will not rebound after it moves to closed position, and I here show for this purpose a latching device consisting of a two armed latch 411 (see Figs. 4, 16a and 17) pivotally mounted at 412 between frame plate 47 and a supporting plate 413 mounted on a block 414 secured to plate 47. Plate 413 is co-planar with frame plate 20 so that lug 354 can slide over it, and block 414 as well as plate 413 are accommodated by an aperture 415 in plate 20. One arm 417 of latch 411 carries an upwardly extending roller 418 adapted to be engaged and moved against spring 418' by the advancing end 354 of arm 352, as that arm moves to the position of Fig. 1 at the beginning of the operation of winding the driving spring. The other arm 419 of the latch, which is fast with the first described arm, has a hook 419a at the end adapted to engage in an aperture 420 in the arcuate shutter lug 101 to lock the shutter in closed position. The auxiliary shutter then remains locked in closed position until a subsequent rewinding operation is started. The advancing arm 352 then unlocks latch hook 419 and the auxiliary shutter is then moved open by the operations that release the driving spring to drive the rotating shutters. After being opened, the auxiliary shutter is again latched open; and this last latch is released in timed relation to the exposure operation of the rotating shutters.

1. A shutter mechanism embodying an apertured shutter normally stationary but movable to cause its aperture to recurrently pass an exposure axis, shutter drive means adapted to accelerate the shutter into movement and to drive said shutter to move its aperture a plurality of times past said exposure axis, means to initiate driving of said shutter by said shutter drive means, an auxiliary shutter movable between positions in alinement and out of alinement with said exposure axis, means controlled by the drive initiating means independently of shutter movement for moving the auxiliary shutter out of alinement with the exposure axis, and means actuated in timed relation with the moving shutter to cause the auxiliary shutter to move into alinement with the exposure axis after a predetermined passage of the shutter aperture past the exposure axis and before the next succeeding passage of said aperture past said axis.

2. A shutter mechanism embodying an apertured shutter normally stationary but movable to cause its aperture to recurrently pass an exposure axis, shutter drive means adapted to accelerate the shutter into movement and to drive said shutter to move its aperture a plurality of times past said exposure axis, releasable shutter holding means adapted to hold the shutter drive means against shutter driving operation and to hold the shutter in a position with its aperture out of register with the exposure axis, an auxiliary shutter movable between positions in alinement and out of alinement with said exposure axis, means controlled independently of shutter movement by release of the shutter holding means and acting to move the auxiliary shutter out of alinement with the exposure axis, and means actuated in timed relation with the moving shutter to cause the auxiliary shutter to move into alinement with the exposure axis after a predetermined passage of the shutter aperture past the exposure axis and before the next succeeding passage of said aperture past said axis.

3. A shutter mechanism embodying an apertured shutter movable to cause its aperture to recurrently pass an exposure axis, shutter drive means adapted upon release to drive said shutter to move its aperture a plurality of times past said exposure axis, shutter holding means adapted to hold said shutter drive means against shutter driving operation and movable to release said shutter drive means for shutter driving operation, trip means movable to cause release movement of said shutter holding means to release said shutter drive means, an auxiliary shutter movable between positions in alinement and out of alinement with said exposure axis, means controlled by movement of said trip means for moving the auxiliary shutter out of alinement with the exposure axis, and means actuated in timed relation with the moving shutter to cause the auxiliary shutter to move into alinement with the exposure axis after a predetermined passage of the shutter aperture past the exposure axis and before the next succeeding passage of said aperture past said axis.

4. A shutter mechanism embodying an apertured shutter movable to cause its aperture to recurrently pass an exposure axis, shutter drive means adapted upon release to drive said shutter to move its aperture a plurality of times past said exposure axis, shutter holding means adapted to hold said shutter drive means against shutter driving operation and movable to release said shutter drive means for shutter driving operation, trip means movable to cause release movement of said shutter holding means to release said shutter drive means, an auxiliary shutter movable between positions in alinement and out of alinement with said exposure axis, means controlled by an initial part of said movement of said trip means, before release movement of said shutter holding means is caused, for moving the auxiliary shutter out of alinement with the exposure axis, and means actuated in timed relation with the moving shutter to cause the auxiliary shutter to move into alinement with the exposure axis after a predetermined passage of the shutter aperture past the exposure axis and before the next succeeding passage of said aperture past said axis.

5. A shutter mechanism embodying an apertured shutter having an exposure aperture and movable to cause its aperture to recurrently pass an exposure axis, shutter drive means including a drive spring connected to said shutter and adapted when strained to drive said shutter to move its aperture a plurality of times past said exposure axis, releasable shutter holding means for holding said shutter while said drive spring is strained, an auxiliary shutter movable between positions in alinement and out of alinement with said exposure axis, means operating in conjunction with the release operation of said shutter holding means for moving the auxiliary shutter out of alinement with the exposure axis, and means actuated in timed relation with the moving shutter to cause the auxiliary shutter to move into alinement with the exposure axis after a predetermined passage of the shutter aperture past the exposure axis and before the next succeeding passage of said aperture past said axis.

6. A shutter mechanism embodying interconnected apertured low and high speed shutters normally stationary but movable to cause their respective apertures to recurrently pass an exposure axis at different frequencies bearing a fixed ratio to one another, said shutters being so synchronized that a high speed shutter aperture recurrently passes the exposure axis coincidently with a low speed shutter aperture, shutter drive means adapted to accelerate the shutters into movement and to drive said shutters to move their respective exposure apertures a plurality of times past said exposure axis, means to initiate driving of said shutters by said shutter drive means, an auxiliary shutter movable between positions in alinement and out of alinement with said exposure axis, means controlled by the drive initiating means for moving the auxiliary shutter out of alinement with the exposure axis, and means actuated in timed relation with the moving shutters to cause the auxiliary shutter to move into alinement with the exposure axis after a predetermined coincidental driven passage of the low and high speed shutter apertures past the exposure axis and before the next succeeding coincidental passages of said apertures past said axis.

7. A shutter mechanism embodying interconnected apertured low and high speed shutters movable to cause their respective apertures to recurrently pass an exposure axis at different frequencies bearing a fixed ratio to one another, said shutters being so synchronized that a high speed shutter aperture recurrently passes the exposure axis coincidently with a low speed shutter aperture, shutter drive means adapted upon release to drive the shutters to move their respective exposure apertures a plurality of times past said exposure axis, shutter holding means adapted to hold said shutter drive means against shutter driving operation and movable to release said shutter drive means for shutter driving operation, trip means movable to cause release movement of said shutter holding means to release said shutter drive means, an auxiliary shutter movable between positions in alinement and out of alinement with said exposure axis, means controlled by movement of said trip means for moving the auxiliary shutter out of alinement with the exposure axis, and means actuated in timed relation with the moving shutters to cause the auxiliary shutter to move into alinement with the exposure axis after a predetermined coincidental driven passage of the low and high speed shutter apertures past the exposure axis and before the next succeeding coincidental passage of said apertures past said axis.

8. A shutter mechanism embodying interconnected apertured low and high speed shutters movable to cause their respective apertures to recurrently pass an exposure axis at different frequencies bearing a fixed ratio to one another, said shutters being so synchronized that a high speed shutter aperture recurrently passes the exposure axis coincidently with a low speed shutter aperture, shutter drive means including a drive spring geared to said shutters and adapted when strained to drive said shutters to move their respective apertures a plurality of times past said exposure axis, releasable shutter holding means for holding said shutters while said drive spring is strained, an auxiliary shutter movable between positions in alinement and out of alinement with said exposure axis, means operating in conjunction with the release operation of said shutter holding means for moving the auxiliary shutter out of alinement with the exposure axis, and means actuated in timed relation with the moving shutters to cause the auxiliary shutter to move into alinement with the exposure axis after a predetermined coincidental driven passage of the low and high speed shutter apertures past the exposure axis and before the next succeeding coincidental passage of said apertures past said axis.

9. A shutter mechanism embodying an apertured shutter normally stationary but movable to cause its aperture to pass an exposure axis, shutter drive means adapted to accelerate the shutter into movement and to drive said shutter to move its aperture past said exposure axis, means operable to initiate driving of said shutter by said shutter drive means, an auxiliary shutter movable between positions in alinement and out of alinement with said exposure axis, means actuated in timed relation with the operation of the drive initiating means and before the shutter aperture crosses the exposure axis to move the auxiliary shutter out of alinement with the exposure axis, and means actuated in timed relation with the driven shutter to cause the auxiliary shutter to move back ino alinement with the exposure axis after the shutter aperture passes the exposure axis.

10. A shutter mechanism embodying an apertured shutter movable to cause its aperture to recurrently pass an exposure axis, shutter drive means adapted upon release to drive said shutter to move its aperture a plurality of times past said exposure axis, shutter holding means movable to a shutter holding position to hold said shutter drive means against shutter driving operation and retractable from said position to release said shutter drive means for shutter driving operation, said shutter holding means being adapted to hold the shutter with its exposure aperture out of alinement with the exposure axis, an auxiliary shutter movable between positions in alinement and out of alinement with said exposure axis, means automatically controlled to be effective only after said shutter holding means moves to shutter holding position, and prior to a predetermined driven passage of the shutter aperture past the exposure axis, for moving the auxiliary shutter out of alinement with the exposure axis, and means actuated in timed relation with the moving shutter to cause the auxiliary shutter to move into alinement with the exposure axis after a predetermined passage of the shutter aperture past the exposure axis and before the next succeeding passage of said aperture past said axis.

11. A shutter mechanism embodying an apertured shutter movable to cause its aperture to recurrently pass an exposure axis, shutter drive means adapted upon release to drive said shutter to move its aperture a plurality of times past said exposure axis, shutter holding means movable to a shutter holding position to hold said shutter drive means against shutter driving operation and retractible from said position to release said shutter drive means for shutter driving operation, said shutter holding means being adapted to hold the shutter with its exposure aperture out of alinement with the exposure axis, trip means operable to cause release retraction of the shutter holding means, an auxiliary shutter movable between positions in alinement and out of alinement with said exposure axis, means actuated by release operation of the trip for moving the auxiliary shutter out of alinement with the exposure axis, and means actuated in timed relation with the moving shutter to cause the auxiliary shutter to move into alinement with the exposure axis after a predetermined passage of the shutter aperture past the exposure axis and before the next succeeding passage of said aperture past said axis.

12. A shutter mechanism embodying an apertured shutter normally stationary but movable to cause its aperture to pass an exposure axis, shutter drive means adapted to be conditioned to accelerate the shutter into movement and to drive said shutter to move its exposure aperture past said exposure axis, means operable to initiate driving of said shutter by said shutter drive means, an auxiliary shutter movable between positions in alinement and out of alinement with said exposure axis, means movable, in conjunction with said conditioning of the shutter drive means, into a position of readiness to move said auxiliary shutter out of alinement with the exposure axis, and then operable in conjunction with the means for initiating driving of the shutter and before the shutter aperture crosses the exposure axis to move the auxiliary shutter out of alinement with said axis, and means actuated in timed relation with the driven shutter to cause the auxiliary shutter to move back into alinement with the exposure axis after the shutter aperture passes the exposure axis.

13. A shutter mechanism embodying an apertured shutter movable to cause its aperture to recurrently pass an exposure axis, shutter drive means adapted upon release to drive said shutter to move its aperture past said exposure axis, releasable shutter holding means movable between a shutter holding position and a shutter release position, trip means movable, when said shutter holding means moves to shutter holding position, to a position to lock said shutter holding means in that position, and movable from said position to unlock and permit release movement of the shutter holding means, an auxiliary shutter movable between positions in alinement and out of alinement with said exposure axis, means movable, in conjunction with movement of said trip means as it locks the shutter holding means, into a position of readiness to move said auxiliary shutter out of alinement with the exposure axis, and then operable in conjunction with movement of said trip means in unlocking said shutter holding means to move the auxiliary shutter out of alinement with the exposure axis, and means actuated in timed relation with the driven shutter to cause the auxiliary shutter to move back into alinement with the exposure axis after the shutter aperture passes the exposure axis.

14. A shutter mechanism embodying an apertured shutter movable to cause its aperture to recurrently pass an exposure axis, shutter drive means adapted upon release to drive said shutter to move its exposure aperture past said exposure aperture, releasable shutter holding means movable between a shutter holding position and a shutter release position, trip means movable, when said shutter holding means moves to shutter holding position, to a position to lock said shutter holding means in that position, and movable from said position to unlock and permit release movement of the shutter holding means, an auxiliary shutter movable between positions in alinement and out of alinement with said exposure axis, means operable in conjunction with movement of said trip means as it locks the shutter holding means to move into a position of readiness to move said auxiliary shutter out of alinement with the exposure axis, and then operable in conjunction with movement of said trip means in unlocking said shutter holding means to move the auxiliary shutter out of alinement with the exposure axis, a latch for latching the auxiliary shutter out of alinement with the exposure axis, a spring urging the auxiliary shutter to return to position in alinement with the exposure axis, and means actuated in timed relation with the driven shutter to release said latch and cause the spring urged auxiliary shutter to move back into alinement with the exposure axis after the shutter aperture passes the exposure axis.

15. A driving mechanism for a shutter or similar driven member, comprising, a normally closed driving train of constrained motion transmitting elements, said train including an energy storing element having an energy receiving end and and energy output end and adapted to be strained by relative movement of its ends to store energy, the energy output end being drivingly connected with the driven member, said train also including as elements a pair of mutually-relatively movable and normally engaging abutments which are moved relatively apart by virtue of relative energy storing movement of the storing element ends, means connected with the energy receiving end of the energy storing element for moving said element and the driving train in a direction to strain said element when its energy output end is held relatively stationary, releasable means for releasably holding the energy output end of the energy storing element, and energy storage stop means operative to stop the movement of the energy receiving end of the energy storing element when a predetermined strain has been placed on said energy storing element, said energy storage stop means being rendered inoperative when the relatively movable abutments are in engagement so as to permit free-wheeling of the driving train.

16. A driving mechanism for a shutter or similar driven member, comprising, a normally closed driving train of constrained motion transmitting elements, said train including an energy storing element having an energy receiving end and an energy ouptput end and adapted to be strained by relative movement of its ends to store energy, the energy output end being drivingly connected with the driven member, said train also including as elements a pair of mutually-relatively movable and normally engaging abutments, one of which is connected with the energy receiving end of the energy storing element and the other of which is connected with the energy output end of the energy storing element, said abutments being moved relatively apart by virtue of relative energy storing movement of the storing element ends, means connected with the energy receiving end of the energy storing element for moving said element and the driving train in a direction to strain said element when its energy output end is held relatively stationary, and releasable means movable to position to be engaged by and stop an element of the portion of the moving driving train between the energy output end of the energy storing element and the second mentioned abutment, so as to stop said portion of the driving train and so hold the energy output end of the energy storing element stationary.

17. A driving mechanism for a shutter or similar driven member, comprising, a normally closed driving train of constrained motion transmitting elements, said train including an energy storing element having an energy receiving end and an energy output end and adapted to be strained by relative movement of its ends to store energy, the energy output end being drivingly connected with the driven member, said train also including as elements a pair of mutually-relatively movable and normally engaging abutments, one of which is connected with the energy receiving end of the energy storing element and the other of which is connected with the energy output end of the energy storing element, said abutments being moved relatively apart by virtue of relative energy storing movement of the storing element ends, means connected with the energy receiving end of the energy storing element for moving said element and the driving train in a direction to strain said element when its energy output end is held relatively stationary, releasable means movable to position to be engaged by and stop an element of that portion of the moving driving train between the energy output end of the energy storing element and said last mentioned abutment, so as to stop said portion of the driving train and so hold the energy output end of the energy storing element stationary, and energy storage stop means operative to stop said movement of said energy receiving end of the energy storing element when a predetermined movement of said energy receiving end has taken place following stopping of the energy output end of the energy storing element, said energy storage stop means being rendered inoperative when the abutments are in engagement to permit free movement of the driving train.

18. A driving mechanism for a shutter or similar driven member, comprising, a normally closed driving train of constrained motion transmitting elements, said train including an energy storing element having two ends, one of which is drivingly connected with the driven member, and adapted to be strained by relative movement of its ends to store energy, said train also including as elements a pair of mutually-relatively movable and normally engaging abutments which are moved relatively apart by virtue of the relative energy storing movement of the storage element ends, means for applying energy to one end of the storage element to move it, and releasable means for releasably holding the driven member against driven movement in any one of a number of selected positions and the relatively movable abutments separated.

19. A driving mechanism for a shutter or similar driving member, comprising, a normally closed driving train of constrained motion transmitting elements, said train including an energy storing element having two ends, one of which is drivingly connected with the driven member, and adapted to be strained by relative movement of its ends to store energy, said train also including as elements a pair of mutually-relatively movable and normally engaging abutments which are moved relatively apart by virtue of the relative energy storing movement of the storage element ends, means for applying energy to one end of the storage element to move it, stop means, effective only when said abutments are mutually separated, acting to limit movement of said end of the storage element, and releasable means for relatively holding the driven member against driven movement in any one of a number of selected positions, so that the storage element may be selectively strained and the relatively movable abutments selectively separated.

20. A driving mechanism for a shutter or similar driven member, comprising, a normally closed driving train of constrained motion transmitting elements, said train including an energy storing element having an energy receiving end and an energy output end and adapted to be strained by relative movement of its ends to store energy, the energy output end being drivingly connected with the driven member, said train also including as elements a pair of mutually-relatively movable and normally engaging abutments which are moved relatively apart by virtue of relative energy storing movement of the storing element ends, means connected with the energy receiving end of the energy storing element for moving said element and the driving train in a direction to strain said element when its energy output end is held relatively stationary, stop means, effective only when said abutments are mutually separated, acting to limit movement of said end of the storage element to a relatively fixed position, and releasable means for releasably holding the energy output end of the storage element in any one of a number of selected positions, so that the storage element may be selectively strained and the relatively movable abutments selectively separated.

21. A driving mechanism for a shutter or similar driven member, comprising, a normally closed driving train of constrained motion transmitting elements, said train including an energy storing element having an energy receiving end and an energy output end and adapted to be strained by relative movement of its ends to store energy, the energy output end being drivingly connected with the driven member, said train also including as elements a pair of mutually-relatively movable and normally engaging abutments, one of which is connected with the energy receiving end of the energy storing element and the other of which is connected with the energy output end of the energy storing element, said abutments being moved relatively apart by virtue of relative energy storing movement of the storing element ends, means connected with the energy receiving end of the energy storing element for moving said element and the driving train in a direction to strain said element when its energy output end is held relatively stationary, said driving train including an element between the output end of the energy storage element and said second mentioned abutment having a plurality of selective stop shoulders, and releasable stop means movable to position to be engaged by a selected one of said stop shoulders, whereby the output end of the energy storing element is held stationary.

22. A driving mechanism for a shutter or similar driven member, comprising, a normally closed driving train of constrained motion transmitting elements, said train including an energy storing element having an energy receiving end and an energy output end and adapted to be strained by relative movement of its ends to store energy, the energy output end being drivingly connected with the driven member, said train also including as elements a pair of mutually-relatively movable and normally engaging abutments, one of which is connected with the energy receiving end of the energy storing element and the other of which is connected with the energy output end of the energy storing element, said abutments being moved relatively apart by virtue of relative energy storing movement of the storing element ends, means connected with the energy receiving end of the energy storing element for moving said element and the driving train in a direction to strain said element when its energy output end is held relatively stationary, said driving train including an element between the output end of the energy storage element and said second mentioned abutment having a plurality of selective stop shoulders, releasable stop means movable to position to be engaged by a selected one of said stop shoulders, whereby the output end of the energy storing element is held stationary, and energy storage stop means operative to stop the movement of the energy receiving end of the energy storing element after a predetermined extent of such movement has taken place, said energy storage stop means being rendered inoperative when the abutments are in engagement to permit free movement of the driving train.

23. A shutter mechanism embodying an apertured shutter movable to cause said aperture to pass an exposure axis, a normally closed driving train of constrained motion transmitting elements, said train including an energy storing element having an energy receiving end and an energy output end and adapted to be strained by movement of its energy receiving end relative to its energy output end to store energy between its ends, said train also including as elements a pair of mutually-relatively movable and normally engaging abutments which are moved relatively apart by virtue of relative movement between the ends of the energy storing element when strained, a driving connection between the energy output end of the energy storing element and the shutter, means connected with the energy receiving end of the energy storing element for moving said element and the driving train in a direction to strain said element when its energy output end is held stationary, shutter holding means movable to a shutter holding position to hold said shutter drive means against shutter driving operation and retractable from said position to release said shutter drive means for shutter driving operation, trip means operable to lock the shutter holding means in its shutter holding position, and operable to unlock and cause release retraction of the shutter holding means, energy storage stop means, effective only when the abutments are separated from one another, for stopping the movement of the energy receiving end of the storing element when a predetermined strain has been placed on said storing element, and means preventing the operation of said trip means which unlocks the shutter holding means until movement of the energy receiving end of the energy storing element is stopped by the energy storage stop means.

24. A driving mechanism for a shutter or similar driven member, comprising a normally closed driving train of constrained motion transmitting elements, said train including a normally unstrained but strainable energy storing element connected at its ends in the train, and elements normally in engagement but mutually separable to form a gap in the train when the storage element is strained to store energy, the train in its normal condition being capable of free movement as a whole, the driven member being drivingly connected with one end of the storage element, means for releasably holding the driven member and the connected end of the storage element against movement, and means for applying energy to the other end of the storage element to strain it and move the separable elements apart, whereby upon release the driven member is driven by the storage element until the separable elements reengage and the train is re-established in normal condition for free movement as a whole.

25. A driving mechanism for a shutter or similar driven member, comprising, a normally closed driving train of constrained motion transmitting elements capable of free unitary movement when in normal closed relation, said train including an energy storing element having an energy receiving end and an energy output end and adapted to be strained by relative movement of its ends to store energy, the output end being drivingly connected with the driven member, said train also including as elements a pair of mutually-relatively movable and normally engaging abutments which are moved relatively apart by virtue of relative energy storing movement of the storage element ends, means connected with the energy receiving end of the energy storing element for applying energy to move said element and the driving train in a direction to strain said element when its energy output end is held relatively stationary, a stop movable to an operative position in which it is adapted to hold the energy out-put end of the energy storing element, and a lost motion actuated device associated with the energy applying means and adapted to cause movement of the stop to its holding position by virtue of energy application to the storage element.

26. A shutter mechanism embodying an apertured shutter movable to cause its aperture to pass an exposure axis, a normally closed driving train of constrained motion transmitting elements, said train including a normally unstrained but strainable energy storing element connected at its ends in the train, and elements normally in engagement but mutually separable to form a gap in the train when the storage element is strained to store energy, the train in its normal condition being capable of free movement as a whole, the shutter being drivingly connected with one end of the storage element, shutter holding means movable to and from a shutter holding position in which it releasably holds the shutter and the connected end of the storage element against movement, means for applying energy to the other end of the storage element to strain it and move the separable elements apart, whereby upon release the shutter is driven by the storage element until the separable elements re-engage and the train is re-established in normal condition for free movement as a whole, and means for holding the releasable shutter holding means out of shutter holding position during driving of the shutter by the energy storing element.

27. A driving mechanism for a shutter or similar driven member, comprising, a normally closed driving train of constrained motion transmitting element, capable of free unitary movement when in normal closed relation, said train including an energy storing element having an energy receiving end and an energy output end and adapted to be strained by relative movement of its ends to store energy, the output end being drivingly connected with the driven member, said train also including as elements a pair of mutually-relatively movable and normally engaging abutments which are moved relatively apart by virtue of relative energy storing movement of the storage element ends, means connected with the energy receiving end of the energy storing element for applying energy to move said element and the driving train in a direction to strain said element when its energy output end is held relatively stationary, a stop movable to an operative position in which it is adapted to hold the energy out-put end of the energy storing element, said means being releasable to move from said operative position to an inoperative position in which the output end of the energy storing element is released to drive the driven member, and means for holding said stop in said inoperative position during driving operation of the energy storing element and during free unitary movement of the driving train.

28. A driving mechanism for a shutter or similar driven member, comprising, a normally closed driving train of constrained motion transmitting elements capable of free unitary movement when in normal closed relation, said train including an energy storing element having an energy receiving end and an energy output end and adapted to be strained by relative movement of its ends to store energy, the output end being drivingly connected with the driven member, said train also including as elements a pair of mutually-relatively movable and normally engaging abutments which are moved relatively apart by virtue of relative energy storing movement of the storing element ends, means connected with the energy receiving end of the energy storing element for applying energy to move said element and the driving train in a direction to strain said element when its energy output end is held relatively stationary, releasable stop means movable to an operative position in which it is adapted to hold the energy out-put end of the energy storing element, energy storage stop means operative to stop the movement of the energy receiving end of the energy storing element when a predetermined strain has been placed on said energy storing element, said releasable stop being releasable after such stoppage of the energy receiving end of the energy storing element to move from said operative position to an inoperative position in which the output end of the energy storing element is released to drive the driven member, means for rendering the energy storage stop means ineffective when the abutments are in engagement to permit free unitary movement of the driving train, and means for holding the releasable stop in said inoperative position during driving operation of the energy storing element and free unitary movement of the driving train.

29. A driving mechanism for a shutter or similar driven member, comprising, a normally closed driving train of constrained motion transmitting elements capable of free unitary movement when in normal closed condition, said train including an energy storing element having an energy receiving end and an energy output end and adapted to be strained by relative movement of its ends to store energy, the output end being drivingly connected with the driven member, said train also including as elements a pair of mutually-relatively movable and normally engaging abutments, one of which is connected with the energy receiving end of the energy storing element and the other of which is connected with the energy output end of the energy storing element, said abutments being moved relatively apart by virtue of relative energy storing movement of the energy element ends, means connected with the energy receiving end of the energy storing element for applying energy to move said element and the driving train in a direction to strain said element when its energy output end is held relatively stationary, said driving train including an element connected to the output end of the energy storage element having a plurality of selective stop shoulders, energy storage stop means operative to stop the movement of the energy receiving end of the energy storing element when a predetermined strain has been placed on said energy storing element, releasable stop means movable to an operative position in which it is engageable by and stops a selected one of said stop shoulders, whereby the output end of the energy storing element is held relatively stationary, said releasable stop means being movable from said operative position to an inoperative position out of engagement with said stop shoulder, whereby the output end of the energy storing element is released to drive the driven member, means for rendering the energy storage stop means ineffective when the abutments are in engagement to permit free unitary movement of the driving train, and means for holding the releasable stop means in said inoperative position during driving operation of the energy storing element and free unitary movement of the driving train.

30. A driving mechanism for a shutter or similar driven member comprising, a normally closed driving train of constrained motion transmitting elements, said train including an energy storing element comprising a drive spring having a winding end and a driving end, said train including as elements a pair of mutually-relatively movable and normally engaging abutments which are moved relatively apart by virtue of relative energy storing movement of the drive spring ends, a stop element connected to the driving end of the spring, means connected with the winding end of the spring for moving said driving train as a whole and for winding said spring when the shutter drive end of the spring is held, a stop movable to an operative position to be engaged by and stop said stop element to hold the driving end of the spring while the spring is wound, said stop being retractable after engagement by said stop element and winding of the spring to an inoperative unengaged position in which the driving end of the wound spring is released to drive the driven member and the portion of the train between said driving end and the abutment connected thereto, to cause said abutment to engage the other abutment and set the remainder of the driving train into movement.

31. A shutter mechanism embodying an apertured shutter movable to cause its aperture to pass an exposure axis, a normally closed driving train of constrained motion transmitting elements, said train including an energy storing element comprising a drive spring having a winding end and a shutter drive end, said train including as elements a pair of mutually-relatively movable and normally engaging abutments which are moved relatively apart by virtue of relative energy storing movement of the drive spring ends, a stop element connected to the shutter drive end of the spring, means connected with the winding end of the shutter for moving said driving train as a whole and for winding said spring when the shutter drive end of the spring is held, a stop movable to an operative position to be engaged by and stop said stop element to hold the shutter drive end of the spring while the spring is wound, said stop being retractable after engagement by said stop element and winding of the spring to an inoperative unengaged position in which the shutter drive end of the wound spring is released to drive the shutter and the portion of the train between said shutter drive end and the abutment connected thereto, to cause said abutment to engage the other abutment and set the remainder of the driving train into movement, the shutter aperture being timed to cross the exposure axis substantially coincidently with the said engagement of the abutments.

32. A driving mechanism for a shutter or similar driven member, comprising a normally closed driving train of constrained motion transmitting elements, said train including a normally unstrained but strainable energy storing element connected at its ends in the train, and elements normally in engagement but mutually separable to form a gap in the train when the storage element is strained to store energy, the train in its normal condition being capable of free movement as a whole, the driven member being drivingly connected with one end of the storage element, means for releasably holding the driving end of the storage element against movement, means for applying energy to the other end of the storage element to strain it and move the separable elements apart, whereby upon release the driven member is driven by the storage element until the separable elements reengage and the train is re-established in normal condition for free movement as a whole, and energy storage limiting means, effective only when the separable elements are separated from one another, for limiting the application of energy to said other end of the storage element.

33. A driving mechanism for a shutter or similar driven member, comprising a normally closed driving train of constrained motion transmitting elements, said train including a normally unstrained but strainable energy storing element connected at its ends in the train, and elements normally in engagement but mutually separable to form a gap in the train when the storage element is strained to store energy, the train in its normal condition being capable of free movement as a whole, the driven member being drivingly connected with one end of the storage element, means for releasably holding the driving end of the storage element against movement, in any one of a number of selected positions, so that the storage element may be selectively strained and the relatively movable elements selectively separated, and means for applying energy to the other end of the storage element to strain it and move the separable elements apart, whereby upon release the driven member is driven by the storage element until the separable elements re-engage and the train is re-established in normal condition for free movement as a whole.

34. A shutter mechanism embodying an apertured shutter movable to cause its aperture to pass an exposure axis, a normally closed driving train of constrained motion transmitting elements, said train including a normally unstrained but strainable energy storing element connected at its ends in the train, and elements normally in engagement but mutually separable to form a gap in the train when the storage element is strained to store energy, the train in its normal condition being capable of free movement as a whole, the shutter being drivingly connected with one end of the storage element, means for releasably holding the shutter and the connected end of the storage element against movement, and means for applying energy to the other end of the storage element to strain it and move the separable elements apart, whereby upon release the shutter is driven by the storage element until the separable elements reengage and the train is re-established in normal condition for free movement as a whole, the shutter aperture being timed to cross the exposure axis substantially coincidently with said reengagement of said separable elements.

35. A driving mechanism for a shutter or similar driven member, comprising a normally closed driving train of constrained motion transmitting elements including a coiled drive spring having a winding end and a driving end, a pair of rotatable mutually-relatively movable abutments in the train between the two ends of the spring, the abutment connected with the winding end of the spring being moved away from the other abutment when the spring is wound from its winding end with its driving end held relatively stationary, a rotatable selector driven by the driving end of the spring, winding means connected with the winding end of the spring, said rotatable selector having a plurality of circumferentially spaced stop shoulders adapted to be engaged to stop movement of the driving end of the spring, and a selector stop and release element movable to position to be engaged by a selected stop shoulder of said selector, and retractable from said position to release the selector and drive spring.

36. A driving mechanism for a shutter or similar driven member, comprising a normally closed driving train of constrained motion transmitting elements including a coiled drive spring having a winding end and a driving end, a pair of rotatable mutually-relatively movable abutments in the train between the two ends of the spring, the abutment connected with the winding end of the spring being moved away from the other abutment when the spring is wound from its winding end with its driving end held relatively stationary, a rotatable axially adjustable selector driven by the driving end of the spring, winding means connected with the winding end of the spring, said selector having a plurality of circumferentially and axially spaced stop shoulders adapted to be engaged to stop movement of the driving end of the spring, means for axially adjusting the position of the selector, and a selector stop and release element movable to position to be engaged by any one of the stop shoulders of the rotatable selector depending upon the axial adjustment of the selector, and retractable from said position to release the selector and the driving end of the drive spring.

37. A driving mechanism for a shutter or similar driven member, comprising a normally closed driving train of constrained motion transmitting elements including a coiled drive spring having a winding end and a driving end, a pair of rotatable mutually-relatively movable abutments in the train between the two ends of the spring, the abutment connected with the winding end of the spring being moved away from the other abutment when the spring is wound from its winding end with its driving end held relatively stationary, a rotatable axially adjustable selector driven by the driving end of the spring, winding means connected with the winding end of the spring, said selector having a plurality of circumferentially and axially spaced stop shoulders adapted to be engaged to stop movement of the driving end of the spring, means for axially adjusting the position of the selector, a selector stop and release element movable to position to be engaged by any one of the stop shoulders of the rotatable selector depending upon the axial adjustment of the selector, and retractable from said position to release the selector and the driving end of the drive spring, and winding limiting means for terminating spring winding at a predetermined position of rotation of the abutment connected with the winding end of the spring, which position is reached after said abutment has moved apart from the other abutment, said winding limiting means being operative only when the abutments are apart.

38. A driving mechanism for a shutter or similar driven member, comprising a normally closed driving train of constrained motion transmitting elements including a coiled drive spring having a winding end and a driving end, a pair of rotatable mutually-relatively movable abutments in the train between the two ends of the spring, the abutment connected with the winding end of the spring being moved away from the other abutment when the spring is wound from its winding end with its driving end held relatively stationary, a rotatable axially adjustable selector driven by the driving end of the spring, winding means connected with the winding end of the spring, said selector having a plurality of circumferentially and axially spaced stop shoulders adapted to be engaged to stop movement of the driving end of the spring, means for axially adjusting the position of the selector, a selector stop and release element movable to position to be engaged by any one of the stop shoulders of the rotatable selector depending upon the axial adjustment of the selector, and retractable from said position to release the selector and the driving end of the drive spring, winding limiting means for terminating spring winding at a predetermined position of rotation of the abutment connected with the winding end of the spring, which position is reached after said abutment has moved apart from the other abutment, and means for rendering said winding limiting means ineffective while the abutments are in mutual engagement.

39. A driving mechanism for a shutter or similar driven member, comprising a normally closed driving train of rotatable motion transmitting elements including a coiled drive spring having a winding end and a driving end, a pair of rotatable mutually-relatively movable abutments in the train between the two ends of the spring, the abutment connected with the winding end of the spring being moved apart from the other abutment when the spring is wound from its winding end with its driving end held relatively stationary, a rotatable selector driven by the driving end of the drive spring, winding means connected with the winding end of the spring, said rotatable selector having a stop shoulder adapted to be engaged to stop movement of the driving end of the spring, a selector stop and release element movable to position to be engaged by the selector stop shoulder, and retractable from said position to release the selector and drive spring, a winding stop mounted on a rotatable element of said driving train between said abutments and the winding end of the spring, and stop means engageable by said winding stop at a predetermined position of rotation of the abutment connected with the winding end of the spring, said stop means being operative to be engaged by and stop the winding stop when the abutments are apart and being disabled when the abutments are in mutual engagement.

40. A shutter mechanism embodying an apertured shutter movable to cause its aperture to recurrently pass an exposure axis, an auxiliary shutter movable between positions in alinement and out of alinement with said exposure axis, shutter driving means embodying a normally closed driving train of constrained motion transmitting elements, said train including a normally unstrained energy storing element connected at its ends in the train, and being adapted to be strained by relative movement of its ends, said train also including a pair of elements normally in engagement but mutually separable to form a gap in the train when the ends of the storage element are relatively moved to store energy, the train in its normal condition being capable of free movement as a whole, the shutter being drivingly connected with one end of the storage element, releasable shutter holding means movable to and retractable from a shutter holding position in which it holds the shutter against driven movement, means for moving the other end of the storage element to strain it and move the separable elements apart while the shutter is being held by said shutter holding means, energy storage limiting means, effective only while the separable elements are mutually separated, for terminating the energy storing movement of said other end of the storage element in a predetermined position, trip means operative to lock said shutter holding means in said shutter holding position until the energy storage movement of said relatively moved end of the storage element is terminated, and then operable to move the auxiliary shutter out of alinement with the exposure axis and to unlock the shutter holding means for release retraction, whereby the shutter is driven by the storage element until the separable elements re-engage and the train is reestablished in normal condition for free movement as a whole, and means actuated in timed relation with the moving shutter to cause the auxiliary shutter to move into alinement with the exposure axis after a predetermined passage of the shutter aperture past the exposure axis and before the next succeeding passage of said aperture past said axis.

41. A driving mechanism for a shutter or similar driven member, comprising a normally closed driving train of constrained motion transmitting elements adapted, in the normally closed condition of the train, to move freely in unison, said train including an energy storing element having two ends, one of which is drivingly connected with the driven member, and adapted to be strained by relative movement of its ends to store energy, said driving train also including as elements a pair of mutually-relatively movable and normally engaging abutments which are moved relatively apart and thus open the driving train by virtue of the relative energy storing movement of the storage element ends, means for applying energy to one end of the storage element to move it relatively to the other end, and normally inactive holding means adapted to be temporarily applied to hold the driving end of the storage element against movement and adapted to be placed in its normal inactive condition to release said driving end for driven movement, whereby upon release of said holding means the driving end of the storage element may move relatively to its other end and the two abutments may engage and thereafter the driving train may move freely as a unit.

42. A driving mechanism as specified in claim 41, and in which the normally inactive holding means is provided with means normally holding it in inactive condition and with releasable means for holding it in its temporary condition to hold the driving end of the storage element.

43. A driving mechanism as specified in claim 41, and in which the normally inactive holding means is placed in its holding condition by virtue of energy storing movement of the energy storing element.

44. A driving mechanism as specified in claim 41 and which includes also a means for positively preventing the placement of the holding means in active holding condition during movement of the driving train as a unit.

45. A driving mechanism for a shutter or similar driven member, comprising a normally closed driving train of constrained motion transmitting elements, said train including an energy storing element having an energy receiving end and an energy output end and adapted to be strained by relative movement of its ends to store energy, the energy output end being drivingly connected with the driven member, said train also including as elements a pair of mutually-relatively movable and normally engaging abutments which are moved relatively apart by virtue of relative energy storing movement of the storing element ends, means connected with the energy receiving end of the energy storing element for moving said element and the driving train in a direction to strain said element when its energy output end is held relatively stationary, releasable means for releasably holding the energy output end of the energy storing element in any selected one of a number of positions, energy storage stop means operative to stop the movement of the energy receiving end of the storing element in a fixed position, said energy storage stop means being rendered inoperative when the relatively movable abutments are in engagement so as to then permit free movement of the driving train as a unit.

46. A shutter mechanism embodying an apertured shutter movable to cause its aperture to recurrently pass an exposure axis, a driving mechanism for the shutter comprising a normally closed driving train of constrained motion transmitting elements adapted, in the normally closed condition of the train, to move freely in unison, said train including an energy storing element having two ends, one of which is drivingly connected with the shutter, and adapted to be strained by relative movement of its ends to store energy, said driving train also including as elements a pair of mutually-relatively movable and normally engaging abutments which are moved relatively apart and thus open the driving train by virtue of the relative energy storing movement of the storage element ends, means for applying energy to one end of the storage element to move it relatively to the other end, and normally inactive holding means adapted to be temporarily applied to hold the driving end of the storage element against movement and adapted to be placed in its normal inactive condition to release said driving end for driven movement, whereby upon release of said holding means the driving end of the storage element may move relatively to its other end and the two abutments may engage and thereafter the driving train may move freely as a unit and thereby recurrently move the shutter aperture past the exposure axis, an auxiliary shutter movable between positions in alinement and out of alinement with the exposure axis, means causing movement of the auxiliary shutter out of axis alinement before a predetermined passage of the shutter aperture past the axis, and means actuated in timed relation with the moving shutter to cause the auxiliary shutter to move into alinement with the exposure axis after said predetermined aperture passage past the axis and before the next such aperture passage.

LOUIS B. HOFFMANN.